US006850032B1

(12) United States Patent
Peterson

(10) Patent No.: US 6,850,032 B1
(45) Date of Patent: Feb. 1, 2005

(54) METHODS AND APPARATUS FOR PROVIDING A DUAL VOLTAGE INVERTER

(75) Inventor: William A. Peterson, Vestal, NY (US)

(73) Assignee: E & M Power, Inc., Binghamton, NY (US)

( * ) Notice: Subject to any disclaimer, the term of this patent is extended or adjusted under 35 U.S.C. 154(b) by 0 days.

(21) Appl. No.: 10/649,195

(22) Filed: Aug. 27, 2003

(51) Int. Cl.[7] ............................................. H02P 5/34
(52) U.S. Cl. ...................................... 318/801; 318/526
(58) Field of Search ................................ 318/801, 526, 318/141; 322/44

(56) References Cited

U.S. PATENT DOCUMENTS 6,154,378 A    11/2000   Peterson et al.

OTHER PUBLICATIONS

Borojevic, Dusan; Nonlinear Algorithms For Fast and Robust Control Of Electrical Drives, Virginia Polytechnic Institute and State University, Jan. 1986, pp. 1–280.

Primary Examiner—Karen Masih
(74) Attorney, Agent, or Firm—Kaplan & Gilman, LLP

(57) ABSTRACT

Methods and apparatus for achieving a system, including: a polyphase machine having a plurality of sets of polyphase windings, each of the respective windings of a first of the sets of polyphase windings being inductively linked to one of each of the respective windings of the remaining sets of polyphase windings; a polyphase inverter operable to receive power from the windings of the first set and to produce a polyphase output; and a plurality of single-phase inverters, each operable to receive power from the windings of a respective one of the remaining sets and to produce a single-phase output, wherein each of the respective phases of the polyphase output may be coupled in series or parallel with one of the respective single-phase outputs to produce an aggregate polyphase output.

55 Claims, 16 Drawing Sheets

METHODS AND APPARATUS FOR PROVIDING A DUAL VOLTAGE INVERTER

BACKGROUND OF THE INVENTION

The present invention is related to methods and apparatus for employing a polyphase machine and inverter circuitry in order to produce a multiphase AC output characteristic that can take on either of two voltage levels.

Generators are traditionally employed to convert rotational power into electrical power, whether the generator is land-based, part of an aerospace system, part of a marine system, etc. Often, it is desirable to be able to configure a generator in order to output more than one voltage level, such as two levels that are different in magnitude by about 2:1. The traditional approach to implementing such a generator is illustrated in FIGS. 1–3.

FIG. 1 is a schematic diagram illustrating a three-phase, dual-winding generator 10. The generator 10 includes a field winding and three sets of phase windings, phase A, phase B, and phase C. Each set of phase windings includes a winding pair, which are in phase with one another and produce about the same voltage as one another as a function of the characteristics of the field winding. Two different AC voltage outputs may be obtained by configuring the sets of phase windings either in parallel or in series.

FIG. 2 is a schematic diagram illustrating the dual-winding generator 10 in a way that produces a voltage V by placing the windings of the respective sets of phase windings in parallel. This configuration produces a polyphase output at nodes A, B, and C including a neutral N. In this configuration, the current from the generator 10 to a load (not shown) is shared among the windings of each phase and, therefore, each winding carries one half of the load current at the full output voltage V. The effective utilization of the generator 10 in this configuration is about 100 percent.

FIG. 3 is a schematic diagram illustrating the dual-winding generator 10 configured in a way to produce an output voltage of 2V. Each of the windings of the respective sets of phase windings is placed in series with one another such that each winding carries the full load current and one half of the output voltage. Again, the effective utilization of the generator 10 in this configuration is about 100 percent.

Although the use of conventional synchronous generators that are configurable to produce different output voltages has been successful to one extent or another, they are difficult to control and do not provide the kind of flexibility that is needed to meet the ever increasing demand for regulated power.

It is desirable to employ permanent magnet alternators (PMAs) to produce a variable voltage, variable frequency output as a function of the alternator speed, rectifying that voltage into a DC source of power, and employing an inverter circuit to convert the DC power into three-phase AC power. This approach offers many advantages, including permitting variable engine speed (resulting in reduced fuel consumption, noise, wet stacking, emissions, size of engine, and in improved engine life). The advantages also include higher PMA efficiency and resultant use of smaller alternator; improved output frequency stability and variability; and improved output voltage stability and transient response. Among the disadvantages of this approach, however, is that the inverter circuit would have to be rated to produce full output current at full output voltage, which is electrically twice the needed deliverable power, even if the inverter does not need to be thermally designed to deliver twice the power.

While it would be desirable to implement the inverter circuit by way of two inverters for connection in series or parallel to produce 2:1 differing output voltages, it is not possible because the configuration of the conventional inverter circuit is limited to a WYE configuration. Although the PMA may be implemented utilizing dual windings that may be placed in series or parallel to produce a DC source of power of 2:1 differing voltage, the conventional inverter circuit cannot achieve this function.

Accordingly, there are needs in the art for methods and apparatus that employ series/parallel configurable inverters in order to convert a DC source of power into a polyphase output of 2:1 differing output voltage.

SUMMARY OF THE INVENTION

In accordance with one or more aspects of the present invention, an apparatus includes: a polyphase machine having a plurality of sets of polyphase windings, each of the respective windings of a first of the sets of polyphase windings being inductively linked to one of each of the respective windings of the remaining sets of polyphase windings; a polyphase inverter operable to receive power from the windings of the first set and to produce a polyphase output; and a plurality of single-phase inverters, each operable to receive power from the windings of a respective one of the remaining sets and to produce a single-phase output. Preferably, each of the respective phases of the polyphase output may be coupled in series or parallel with one of the respective single-phase outputs to produce an aggregate polyphase output.

It is preferred that the polyphase machine includes four sets of three-phase windings; the polyphase inverter is a first inverter operable to produce a three-phase output; the remaining inverters are second, third, and fourth inverters, each operable to produce a single-phase output; and each of the respective phases of the three-phase output may be coupled in series or in parallel with one of the respective single-phase outputs to produce an aggregate three-phase output.

The first set of polyphase windings may be sized to deliver about one half of an output power of the aggregate polyphase output; and each of the remaining sets of polyphase windings may be sized to deliver about $1/(2\times(N-1))$ of the output power of the aggregate polyphase output, where N is the number of sets of polyphase windings.

The polyphase inverter may also be sized to deliver about one half of an output power of the aggregate polyphase output; and each of the single-phase inverters may be sized to deliver about $1/(2\times(N-1))$ of the output power of the aggregate polyphase output, where N is the number of sets of polyphase windings.

Preferably, the inverters are synchronized with one another such that each of the respective single-phase outputs are substantially in phase with one of the respective phases of the polyphase output.

Each of the inverters may include a polyphase rectifier operable to receive power from the windings of a respective one of the sets of polyphase windings, and to produce a respective source of DC power. For example, the polyphase inverter may include: a full multiphase bridge circuit having a plurality of legs coupled across an associated one of the sources of DC power, each leg including a pair of series coupled switching elements forming an intermediate node; and a plurality of low pass filters, each being operatively coupled to a respective one of the intermediate nodes and producing a respective output phase of the polyphase output.

Each of the single-phase inverters may include: a half bridge circuit having a single leg coupled across an associated one of the sources of DC power, the leg including a pair of series coupled switching elements forming an intermediate node; and a low pass filter operatively coupled to the intermediate node and producing an associated one of the single-phase outputs.

The apparatus preferably further includes a control circuit operable to produce a driver signal for each of the switching elements of the inverters. The control circuit is preferably operable to produce driver signals for the inverters, such that (i) respective voltage magnitudes of the phases of the polyphase output are about one half of respective voltage magnitudes of the phases of the aggregate polyphase output; and (ii) respective voltage magnitudes of the single-phase outputs are about one half of the respective voltage magnitudes of the phases of the aggregate polyphase output, when the respective phases of the polyphase output are coupled in series with the respective single-phase outputs to produce the aggregate polyphase output.

The control circuit may be further operable to produce driver signals for the inverters, such that (i) respective current magnitudes of the phases of the polyphase output are about equal to respective current magnitudes of the phases of the aggregate polyphase output; and (ii) respective current magnitudes of the single-phase outputs are about equal to the respective current magnitudes of the phases of the aggregate polyphase output.

The control circuit may also be operable to produce driver signals for the inverters, such that (i) respective voltage magnitudes of the phases of the polyphase output are about equal to respective voltage magnitudes of the phases of the aggregate polyphase output; and (ii) respective voltage magnitudes of the single-phase outputs are about equal to the respective voltage magnitudes of the phases of the aggregate polyphase output, when the respective phases of the polyphase output are coupled in parallel with the respective single-phase outputs to produce the aggregate polyphase output.

In this regard, the control circuit is preferably further operable to produce driver signals for the inverters, such that (i) respective current magnitudes of the phases of the polyphase output are about one half of respective current magnitudes of the phases of the aggregate polyphase output; and (ii) respective current magnitudes of the single-phase outputs are about one half of the respective current magnitudes of the phases of the aggregate polyphase output.

The polyphase inverter preferably includes an intermediate polyphase inverter that is operable to receive power from the windings of the first set of polyphase windings, and to produce and voltage regulate the source of DC power. The intermediate polyphase inverter may include a full multiphase bridge circuit having a plurality of legs coupled across the source of DC power, each leg including a pair of series coupled switching elements forming an intermediate node, each being operatively coupled to a respective one of the windings of the first set of polyphase windings. The control circuit is preferably operable to produce a driver signal for each of the switching elements of the intermediate polyphase inverter.

The control circuit is preferably operable to produce the driver signals such that the intermediate polyphase inverter boosts voltage received from the first set of polyphase windings to produce a boosted voltage at the source of DC power. The control circuit may also cause the intermediate polyphase inverter to boost respective voltages received from the remaining sets of polyphase windings to produce respective boosted voltages at the other sources of DC power of the single-phase inverters, by way of the inductive link between the first set of polyphase windings and one of each of the respective windings of the remaining sets of polyphase windings.

Preferably, each of the respective windings of the first set of polyphase windings is wound in a multifilar configuration with one of each of the respective windings of the remaining sets of polyphase windings to increase the inductive link therebetween. Each of the respective sets of polyphase windings are preferably in a WYE configuration.

The control circuit may be operable to produce the driver signals such that the intermediate polyphase inverter drives the polyphase machine as a motor.

In accordance with one or more further aspects of the present invention, an apparatus includes: means for receiving power from a first set of polyphase windings of a polyphase machine and converting the power into a polyphase output; means for receiving power from remaining sets of polyphase windings of the a polyphase machine and inverting the power into respective single-phase outputs, wherein respective windings of the first set of polyphase windings are inductively linked to one of each of respective windings of the remaining sets of polyphase windings; and means for producing an aggregate polyphase output by coupling each of the respective phases of the polyphase output in series or in parallel with one of the respective single-phase outputs.

The apparatus preferably further includes means for producing a respective source of DC power for each inverter from the received power from the windings of a respective one of the sets of polyphase windings of the polyphase machine.

The apparatus preferably further includes: means for controlling the polyphase inverter such that respective voltage magnitudes of the phases of the polyphase output are about one half of respective voltage magnitudes of the phases of the aggregate polyphase output; and means for controlling the single-phase inverters such that respective voltage magnitudes of the single-phase outputs are about one half of the respective voltage magnitudes of the phases of the aggregate polyphase output, when the respective phases of the polyphase output are coupled in series with the respective single-phase outputs to produce the aggregate polyphase output.

The apparatus may also include: means for controlling the polyphase inverter such that respective current magnitudes of the phases of the polyphase output are about equal to respective current magnitudes of the phases of the aggregate polyphase output; and means for controlling the single-phase inverters such that respective current magnitudes of the single-phase outputs are about equal to the respective current magnitudes of the phases of the aggregate polyphase output.

The apparatus may also include: means for controlling the polyphase inverter such that respective voltage magnitudes of the phases of the polyphase output are about equal to respective voltage magnitudes of the phases of the aggregate polyphase output; and means for controlling the single-phase inverters such that respective voltage magnitudes of the single-phase outputs are about equal to the respective voltage magnitudes of the phases of the aggregate polyphase output, when the respective phases of the polyphase output are coupled in parallel with the respective single-phase outputs to produce the aggregate polyphase output.

The apparatus may also include: means for controlling the polyphase inverter such that respective current magnitudes of the phases of the polyphase output are about one half of respective current magnitudes of the phases of the aggregate polyphase output; and means for controlling the single-phase inverters such that respective current magnitudes of the single-phase outputs are about one half of the respective current magnitudes of the phases of the aggregate polyphase output.

Preferably, the apparatus further includes: means for producing a respective source of DC power for each single-phase inverter from the received power from the windings of a respective one of the sets of polyphase windings of the polyphase machine; means for producing a source of DC power for the polyphase inverter that is operable to receive power from the windings of the first set of polyphase windings, and to boost the voltage received from the first set of polyphase windings to produce a boosted voltage at the source of DC power. The means for producing the source of DC power for the polyphase inverter may also be for boosting respective voltages received from the remaining sets of polyphase windings to produce respective boosted voltages at the other sources of DC power of the single-phase inverter, by way of the inductive link between the first set of polyphase windings and one of each of the respective windings of the remaining sets of polyphase windings. Preferably, the means for producing the source of DC power for the polyphase inverter is also for driving the polyphase machine as a motor.

In accordance with one or more further aspects of the present invention, a method includes: receiving power in a polyphase inverter from a first set of polyphase windings of a polyphase machine and converting the power into a polyphase output; receiving power in a plurality of single-phase inverters from remaining sets of polyphase windings of the polyphase machine and converting the power into respective single-phase outputs, wherein respective windings of the first set of polyphase windings are inductively linked to one of each of respective windings of the remaining sets of polyphase windings; and producing an aggregate polyphase output by coupling each of the respective phases of the polyphase output in series or in parallel with one of the respective single-phase outputs.

The method preferably further includes: sizing the first set of polyphase windings to deliver about one half of an output power of the aggregate polyphase output; and sizing each of the remaining sets of polyphase windings to deliver about one sixth of the output power of the aggregate polyphase output. More generally, the method may include: sizing the first set of polyphase windings to deliver about one half of an output power of the aggregate polyphase output; and sizing each of the remaining sets of polyphase windings to deliver about $1/(2\times(N-1))$ of the output power of the aggregate polyphase output, where N is the number of sets of polyphase windings.

Similarly, the method may include: sizing the polyphase inverter to deliver about one half of an output power of the aggregate polyphase output; and sizing each of the single-phase inverters to deliver about one sixth of the output power of the aggregate polyphase output. More generally, the method may include: sizing the polyphase inverter to deliver about one half of an output power of the aggregate polyphase output; and sizing each of the single-phase inverters to deliver about $1/(2\times(N-1))$ of the output power of the aggregate polyphase output, where N is the number of sets of polyphase windings.

Preferably, the method further includes synchronizing the inverters with one another such that each of the respective single-phase outputs are substantially in phase with one of the respective phases of the polyphase output.

The method preferably further includes: controlling the polyphase inverter such that respective voltage magnitudes of the phases of the polyphase output are about one half of respective voltage magnitudes of the phases of the aggregate polyphase output; and controlling the single-phase inverters such that respective voltage magnitudes of the single-phase outputs are about one half of the respective voltage magnitudes of the phases of the aggregate polyphase output, when the respective phases of the polyphase output are coupled in series with the respective single-phase outputs to produce the aggregate polyphase output. In this regard, the method preferably further includes: controlling the polyphase inverter such that respective current magnitudes of the phases of the polyphase output are about equal to respective current magnitudes of the phases of the aggregate polyphase output; and controlling the single-phase inverters such that respective current magnitudes of the single-phase outputs are about equal to the respective current magnitudes of the phases of the aggregate polyphase output.

The method may further include: controlling the polyphase inverter such that respective voltage magnitudes of the phases of the polyphase output are about equal to respective voltage magnitudes of the phases of the aggregate polyphase output; and controlling the single-phase inverters such that respective voltage magnitudes of the single-phase outputs are about equal to the respective voltage magnitudes of the phases of the aggregate polyphase output, when the respective phases of the polyphase output are coupled in parallel with the respective single-phase outputs to produce the aggregate polyphase output. In this regard, the method preferably further includes: controlling the polyphase inverter such that respective current magnitudes of the phases of the polyphase output are about one half of respective current magnitudes of the phases of the aggregate polyphase output; and controlling the single-phase inverters such that respective current magnitudes of the single-phase outputs are about one half of the respective current magnitudes of the phases of the aggregate polyphase output.

The method preferably further includes: producing a respective source of DC power for each single-phase inverter from the received power from the windings of a respective one of the sets of polyphase windings of the polyphase machine; producing a source of DC power for the polyphase inverter using an intermediate polyphase inverter that is operable to receive power from the windings of the first set of polyphase windings, and to produce and voltage regulate the source of DC power. The intermediate polyphase inverter preferably includes: a full multiphase bridge circuit having a plurality of legs coupled across the source of DC power, each leg including a pair of series coupled switching elements forming an intermediate node, each being operatively coupled to a respective one of the windings of the first set of polyphase windings; and a control circuit operable to produce a driver signal for each of the switching elements of the intermediate polyphase inverter.

The method preferably includes controlling the intermediate polyphase inverter to boost the voltage received from the first set of polyphase windings to produce a boosted voltage at the source of DC power. The method preferably further includes controlling the intermediate polyphase inverter to boost respective voltages received from the remaining sets of polyphase windings to produce respective boosted voltages at the other sources of DC power of the single-phase inverter, by way of the inductive link between the first set of polyphase windings and one of each of the respective windings of the remaining sets of polyphase windings.

Other aspects, features, and advantages of the present invention will be apparent to those skilled in the art from the description herein taken in conjunction with the accompanying drawings.

BRIEF DESCRIPTION OF THE DRAWINGS

For the purposes of illustrating the invention, there are shown in the drawings forms that are presently preferred, it being understood, however, that the invention is not limited by the precise arrangements and instrumentalities shown.

FIG. 16 is a block diagram of a controller suitable for use in the series configured generator system of FIG. 15;

DETAILED DESCRIPTION OF THE INVENTION

Figure 1:
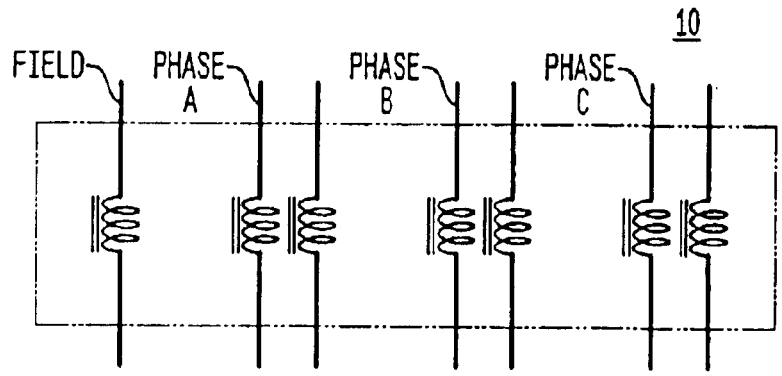
FIG. 1 is a schematic diagram illustrating a conventional synchronous generator employing dual windings.
Figure 2:
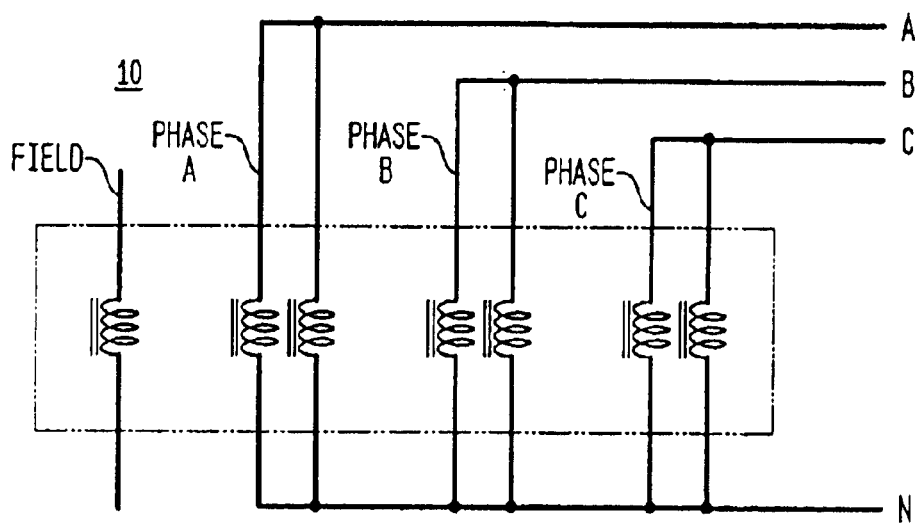
FIG. 2 is a schematic diagram of the conventional synchronous generator of FIG. 1 in a parallel configuration.
Figure 3:
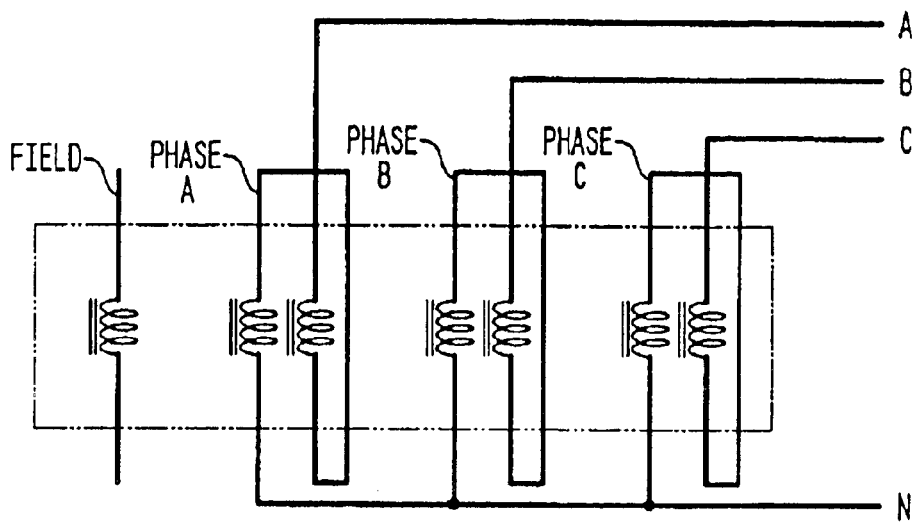
FIG. 3 is a schematic diagram of the conventional synchronous generator of FIG. 1 in a series configuration.
Figure 4:
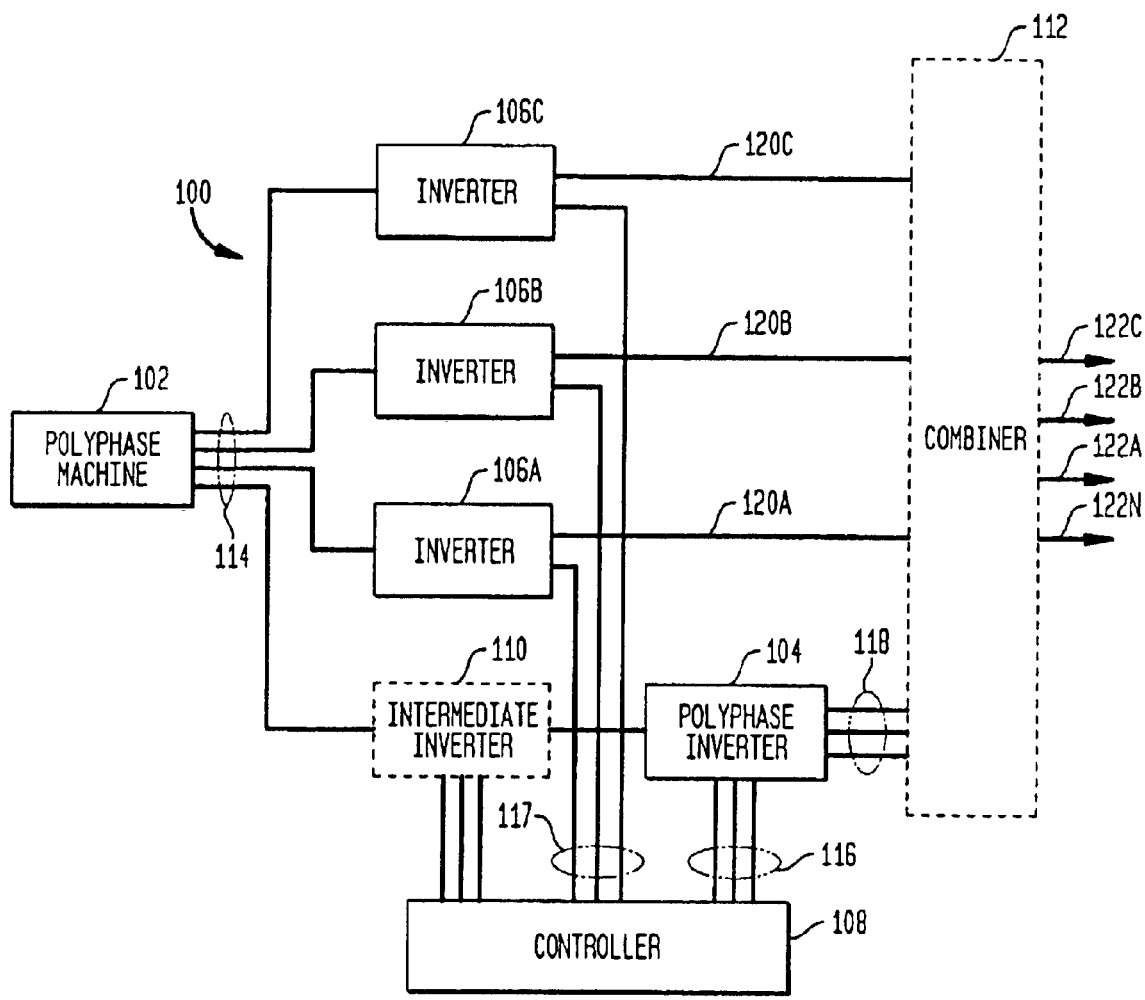
FIG. 4 is a block diagram of a generator system in accordance with one or more aspects of the present invention.

Referring now to the drawings, wherein like numerals indicate like elements, there is shown in FIG. 4 a block diagram of a generator system 100 in accordance with one or more aspects of the present invention. The generator system 100 preferably includes a polyphase machine 102, such as a PMA, a polyphase inverter 104, a plurality of single-phase inverters 106A, 106B, and 106C, and a controller 108. The generator system 100 may also include an intermediate polyphase inverter 110 and a combiner 112.

The polyphase machine 102 includes a plurality of windings that produce respective outputs over lines 114, which are received by the polyphase inverter 104 (or the intermediate polyphase inverter 110 if employed) and the single-phase inverters 106. The controller 108 provides commutation signaling to the polyphase inverter 104 and the single-phase inverters 106 over lines 116 and 117. The power received from the polyphase machine 102 is converted into a polyphase output by the polyphase inverter 104 on lines 118A, 118B, and 118C and is converted into respective single-phase outputs by the single-phase inverters 106A–C on lines 120A, 120B, and 120C.

The combiner 112 may be utilized to place each of the respective phases of the polyphase output on lines 118A–C in series or in parallel with one of the respective single-phase outputs on lines 120A–C to produce an aggregate polyphase output on lines 122A, 122B, and 122C. A neutral node may be employed on line 122N. When the respective phases of the polyphase output on lines 118A–C are coupled in parallel with the respective single-phase outputs on lines 120A–C, then the aggregate polyphase output on lines 122A–C exhibits a voltage that is about one half of the voltage produced when such phases are in a series configuration. Thus, unlike prior approaches, differing output voltage characteristics are achieved by placing the outputs of the respective inverters in series or in parallel, which was not contemplated heretofore.

Figure 5:
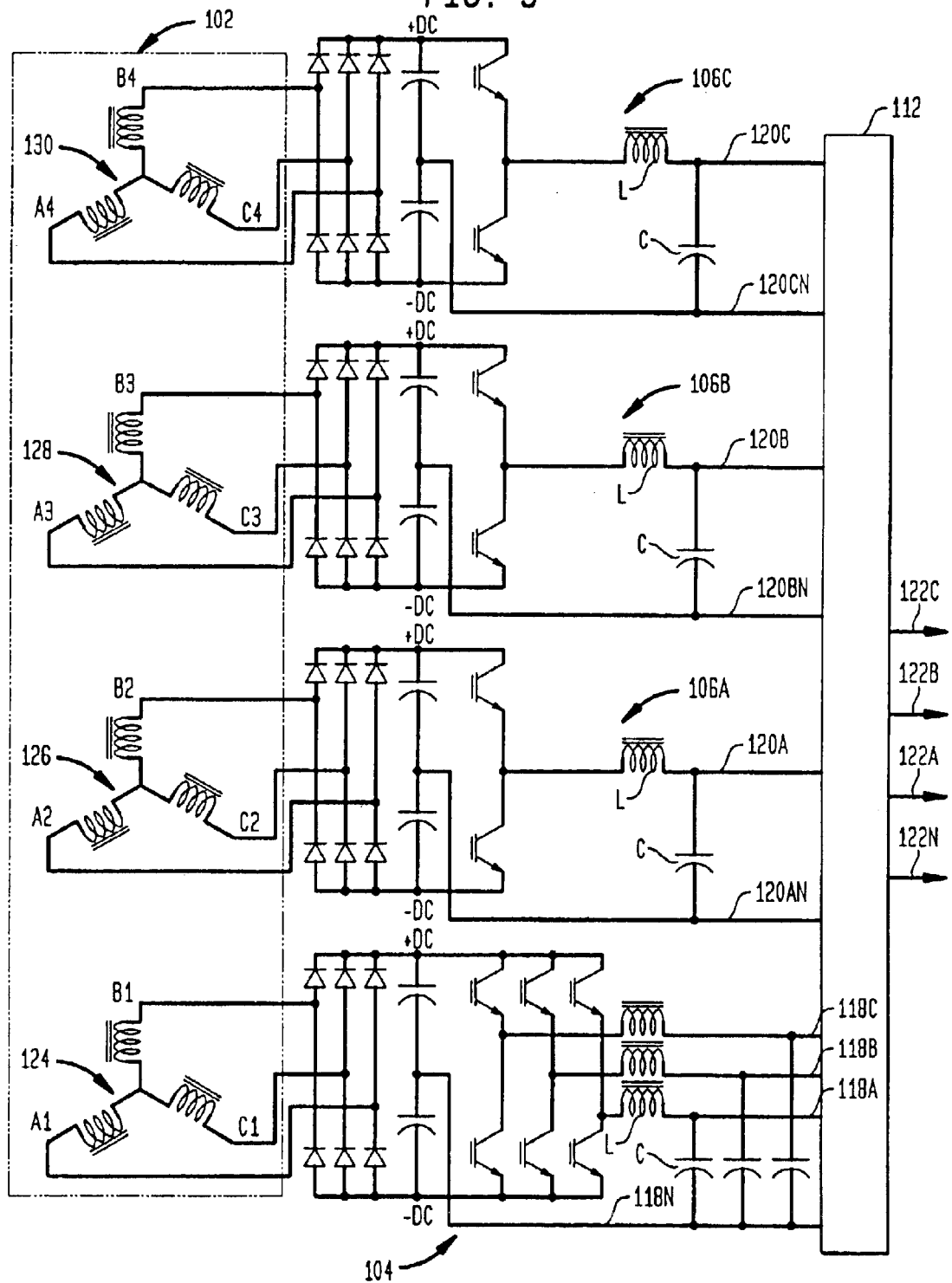
FIG. 5 is a schematic diagram illustrating additional details of the generator system of FIG. 4.

Reference is now made to FIG. 5, which is a schematic diagram illustrating further features of the generator system 100 of FIG. 4. The polyphase machine 102 preferably includes a plurality of sets of multiphase windings. By way of example, the polyphase machine 102 may include four sets of three-phase windings 124, 126, 128, and 130. In this example, each set of polyphase windings includes a phase A winding, a phase B winding, and a phase C winding. Each of the respective windings of the first set of polyphase windings 124 is inductively linked to one of each of the respective windings of the remaining sets of polyphase windings 126, 128, and 130. More particularly, the phase A1 winding of set 124 is inductively linked to the phase A2, phase A3, and phase A4 windings of sets 126, 128, and 130. Similarly, the phase B1 winding of set 124 is inductively linked to the phase B2, phase B3, and phase B4 windings of sets 126, 128, and 130. The same is true of the remaining phase C windings in this example (and any further phases if utilized).

The polyphase inverter 104 and each of the single-phase inverters 106A–C preferably includes a rectifier that is operable to convert the polyphase output voltages from the windings of the polyphase machine 102 into respective sources of DC power. For example, the rectifiers may be implemented utilizing respective sets of diodes in the three-phase bridge configuration to produce positive and negative DC rails (labeled +/− DC). It is understood that any of the known rectification techniques, whether active or passive, may be employed without departing from the spirit and scope of the invention. As illustrated, each of the sources of DC power includes a capacitive half-bridge, including series-coupled capacitors connected across the positive and negative rails of the respective sources of DC power. This defines an intermediate node therebetween that is ideally at a voltage midpoint between the +DC and −DC rails.

The polyphase inverter 104 preferably includes a full polyphase bridge circuit having a plurality of legs coupled across the positive and negative rails of the source of DC power. Each leg may include a pair of series coupled switching elements forming an intermediate node. Any of the known technologies may be employed to implement the switching elements, such as insulted gate bipolar transistors (IGBTs), field effect transistors (FETs), bipolar transistors (BJTs), etc. Each of the intermediate nodes is preferably coupled to a corresponding low-pass filter to produce a respective output phase 118A, 118B, 118C. While any of the known techniques may be employed to implement the low-pass filters, a series coupled inductor (L) and shunt capacitor (C) configuration is preferred.

Each of the single-phase inverters 106A–C preferably includes a half-bridge circuit having a single leg coupled across the positive and negative DC rails of the source of DC power. Each leg preferably includes a pair of series-coupled switching elements forming an intermediate node as was the case with each leg of the full polyphase bridge circuit of the polyphase inverter 104. Each of the single-phase inverters 106A–C also preferably includes a low-pass filter receiving signaling from the respective intermediate nodes in order to produce an associated one of the single-phase outputs 120A, 120B, and 120C. Again, it is preferred that the low-pass filters of the single-phase inverters 106 are implemented utilizing a series inductor (L) and shunt capacitor (C) configuration. Further, respective neutral nodes are preferably established by coupling together the intermediate node of the capacitive half-bridge and the associated shunt capacitor of the low-pass filter.

Figure 6:
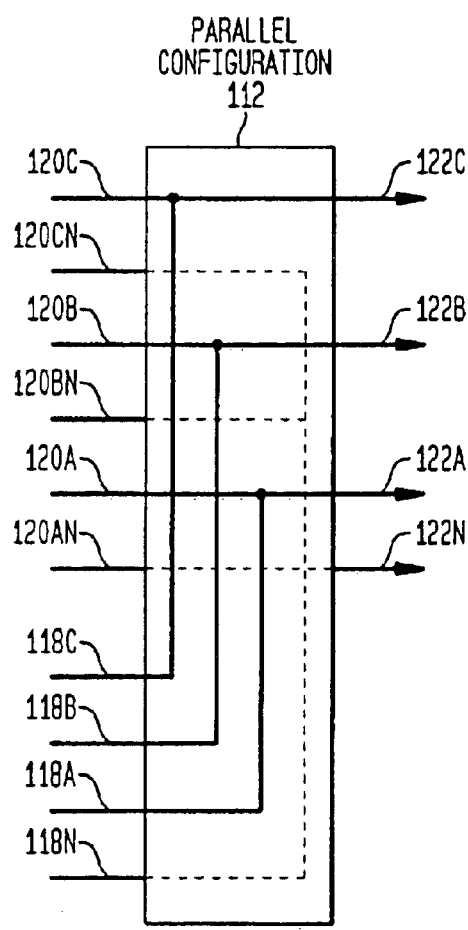
FIG. 6 is a schematic diagram of connections that facilitate achieving a parallel configuration of the generator system of FIG. 4.

With reference to FIG. 6, the combiner 112 is preferably operable to permit the respective output phases 118A, 118B, and 118C of the polyphase output to be placed in parallel with the respective single-phase outputs 120A, 120B, and 120C of the single-phase inverters 106A–C. In this regard, the combiner 112 preferably connects the phase A output 118A of the polyphase inverter 104 to the phase A output 120A of the single-phase inverter 106A, and the phase A output 122C of the aggregate polyphase output. Similarly, the phase B output 118B of the polyphase inverter 104 is connected to the phase B output 120B of the single-phase inverter 106B and the phase B output 122B of the aggregate polyphase output. Still further, the phase C output 118C of the polyphase inverter 104 is connected to the phase C output 120C of the single-phase inverter 106C and the phase C output 122C of the aggregate polyphase output. Lastly, the neutral line 118N of the polyphase inverter 104 is connected to the neutral lines 120AN, 120BN, and 120CN of the single-phase inverters 106A–C, and the neutral line 122N of the aggregate polyphase output.

Figure 7:
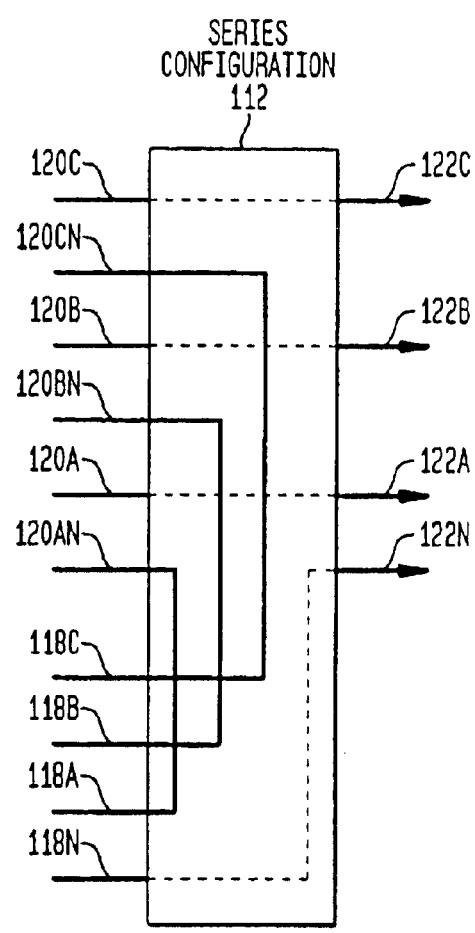
FIG. 7 is a schematic diagram of connections that facilitate achieving a series configuration of the generator system of FIG. 4.

With reference to FIG. 7, in order to achieve the series configuration, the phase A output 118A of the polyphase inverter 104 is connected to the neutral line 120AN of the single-phase inverter 106A and the phase A output 120A of the single-phase inverter 106A is connected to the phase A output 122A of the aggregate polyphase output. Similarly, the phase B output 118B of the polyphase inverter 104 is connected to the neutral line 120BN of the single-phase inverter 106B and the phase B output 120B of the single-phase inverter 106B is connected to the phase B output 122B of the aggregate polyphase output. Still further, the phase C output 118C of the polyphase inverter 104 is connected to the neutral 120CN of the single-phase inverter 106C and the phase C output 120C of the single-phase inverter 106C is connected to the phase C output 122C of the aggregate polyphase output. Lastly, the neutral line 118N of the polyphase inverter 104 is coupled to the neutral node 122N of the aggregate polyphase output.

Any of the known techniques may be employed to implement the combiner 112 that is consistent with the description above. For example, the connections described may be carried out manually or may be implemented by way of electronic switching in response to appropriate control signaling.

Although it is preferred that the neutral nodes are established by way of the interconnection between the intermediate node of the capacitive half-bridge circuits and the shunt capacitors of the respective low-pass filters, any of the known techniques for establishing a neutral connection may be employed without departing from the spirit and scope of the invention. For example, the neutral nodes may be established in the manner taught by U.S. Pat. No. 6,154,378, the entire disclose of which is hereby incorporated by reference.

In connection with the foregoing, it is noted that the first set of multi-phase windings 124 may be sized to deliver about one half of the output power for the aggregate polyphase output 122A–C. In order words, the wire size, insulation, etc., may be designed to deliver about one half of the output current to the polyphase load (not shown). Each of the remaining sets of polyphase windings 126, 128, 130 may then be sized to deliver about one sixth of the output power of the aggregate polyphase output to the load. More generally, the remaining sets of polyphase windings 126, 128, 130 may be sized to deliver about $1/(2 \times (N-1))$ of the rated power of the aggregate polyphase output, where N is the number of sets of polyphase windings of the polyphase machine 102.

As will be discussed in more detail hereinbelow, the respective windings of the sets of multi-phase windings 124, 126, 128 and 130 are preferably wound in a multifiliar winding configuration to enhance the coupling therebetween. This facilitates achieving further aspects of the invention that will be discussed in more detail hereinbelow. For example, the preferred winding approach is to wind each winding with 6N wires in hand, where N is any integer. In this way, the wires may be broken out as 3N in parallel for the first set of polyphase windings 124 (handling one half the power) and 1N for each of the sets of windings 126, 128, 130 (handling one sixth of the power).

Figure 8:
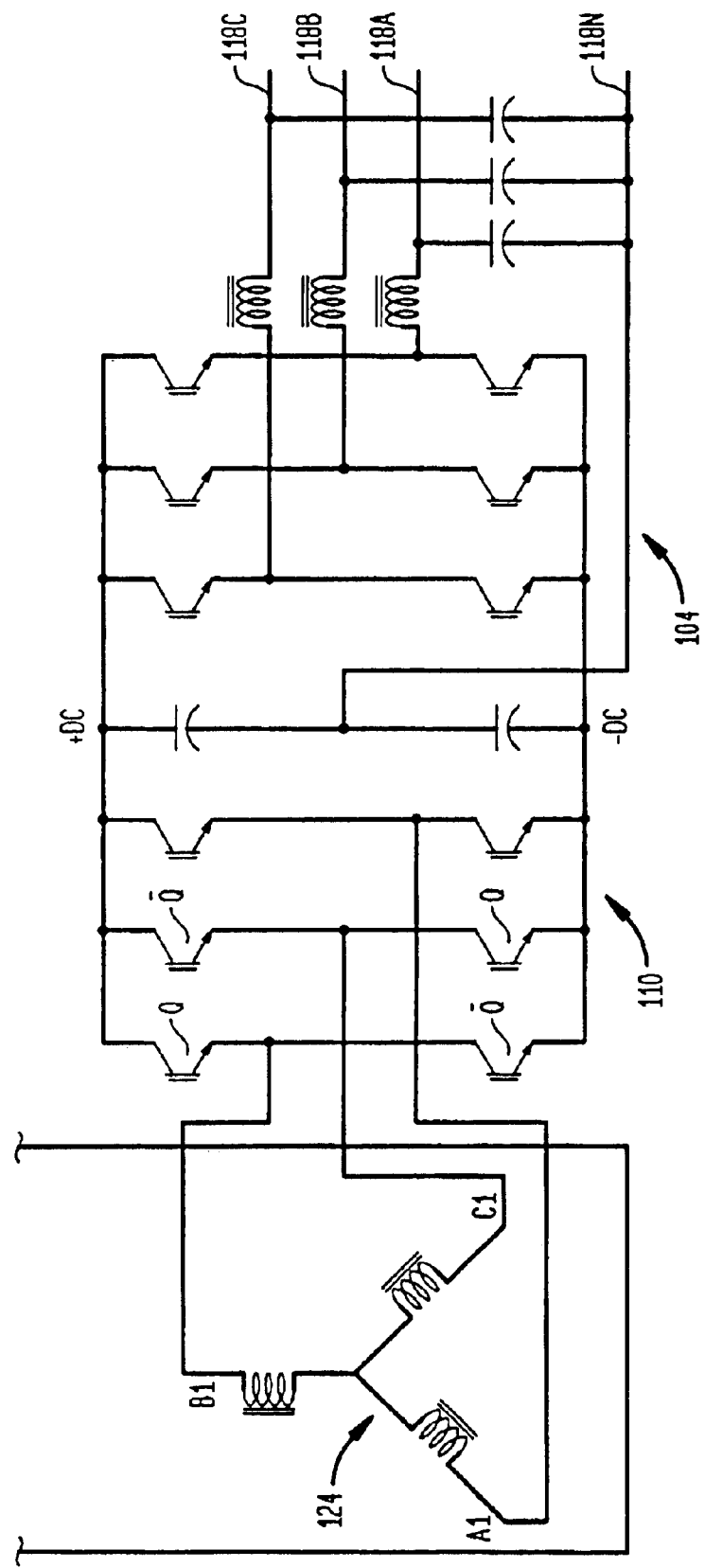
FIG. 8 is a schematic diagram illustrating additional aspects of the generator system of FIG. 5 in order to achieve boost and/or polyphase machine drive capabilities.

With reference to FIG. 8, the tightly coupled characteristic between the first set of polyphase windings 124 and the other sets of polyphase windings 126, 128, and 130 advantageously enables operation of the generator system 100 even at very low rotational speeds of the polyphase machine 102. Indeed, the respective magnitudes of the voltages of the sources of DC power may be made substantially independent from the speed of the polyphase machine 102 by incorporating the intermediate polyphase inverter 110 (FIG. 4) to boost (i) the voltage of the source of DC power of the polyphase inverter 104 as well as the respective sources of DC power of the single-phase inverters 106A–C. The intermediate polyphase inverter 110 is operable to receive power from the first set of polyphase windings 124 and to produce and regulate the voltage of the source of DC power of the polyphase inverter 104.

Preferably, the intermediate polyphase inverter 110 includes a full multi-phase bridge circuit (in this example a three-phase bridge circuit) having a plurality of legs coupled across the positive and negative rails of the source of DC power. Each leg preferably includes a pair of series-coupled switching elements forming respective intermediate nodes therebetween. Each of the intermediate nodes is operatively coupled to a respective one of the windings A1, B1, C1 of the first set of polyphase windings 124. The controller 108 (FIG. 4) is preferably operable to provide driver signals to each of the switching elements of the intermediate polyphase inverter 110 such that the voltage of the source of DC power is boosted at relatively low rotational speeds of the polyphase machine 102.

The boost function of the intermediate polyphase inverter 110 will now be described in more detail by tracing the current flow through the windings of the first set of polyphase windings 124, through the switching elements of the intermediate polyphase inverter 110, and through the capacitive half-bridge of the source of DC power. At relatively high switching frequencies of the intermediate polyphase inverter 110, the derivative of the flux of the polyphase machine 102 with respect to time is relatively constant. Therefore, the back electromotive force (BEMF) of the polyphase machine 102 may be assumed to be constant (i.e., DC), at least for relatively short time intervals such as one switching cycle of the intermediate polyphase inverter 110.

In a given switching cycle, the upper switching element Q of the phase B1 leg is turned on, while the lower switching element Q NOT of that leg is turned off. At the same time, the upper switching element Q NOT of the phase C1 leg is turned off, while the lower switching element Q of that leg is turned on. Under these circumstances, the circulating current flows from the positive DC rail of the source of DC power through the upper switching element Q of the phase B1 leg, through the B1 and C1 windings of the first set of polyphase windings 124, through the lower switching element Q of the phase C1 leg and to the negative DC rail of the source of DC power. This ramps the current up in the B1 and C1 windings of the polyphase machine 102. Later in the switching cycle, the driver signals from the controller 108 (FIG. 4) to the switching elements of the intermediate polyphase inverter 110 reverse such that the Q switching elements turn off and the Q NOT switching elements turn on. This causes the voltages across the B1 and C1 windings to flyback with the BEMF of those windings aiding the current flow. The current flows from the negative DC rail of the source of DC power through the lower switching element Q NOT of the phase B1 leg, through the B1 and C1 windings of the polyphase machine 102, through the upper switching element Q NOT of the phase C1 leg, and into the positive DC rail of the source of DC power. Thus, at low rotational speeds of the polyphase machine 102, the intermediate polyphase inverter 110 operates to boost the voltage from the polyphase machine 102 in order to produce the source of DC power, effectively treating the polyphase machine 102 as a motor in a regenerative braking mode.

For the purposes of brevity, a detailed description of the current flow in the other combinations of windings 124 and legs of the intermediate polyphase inverter 110 will be omitted inasmuch as one skilled in the art will readily appreciate such details from those provided above.

Figure 9:
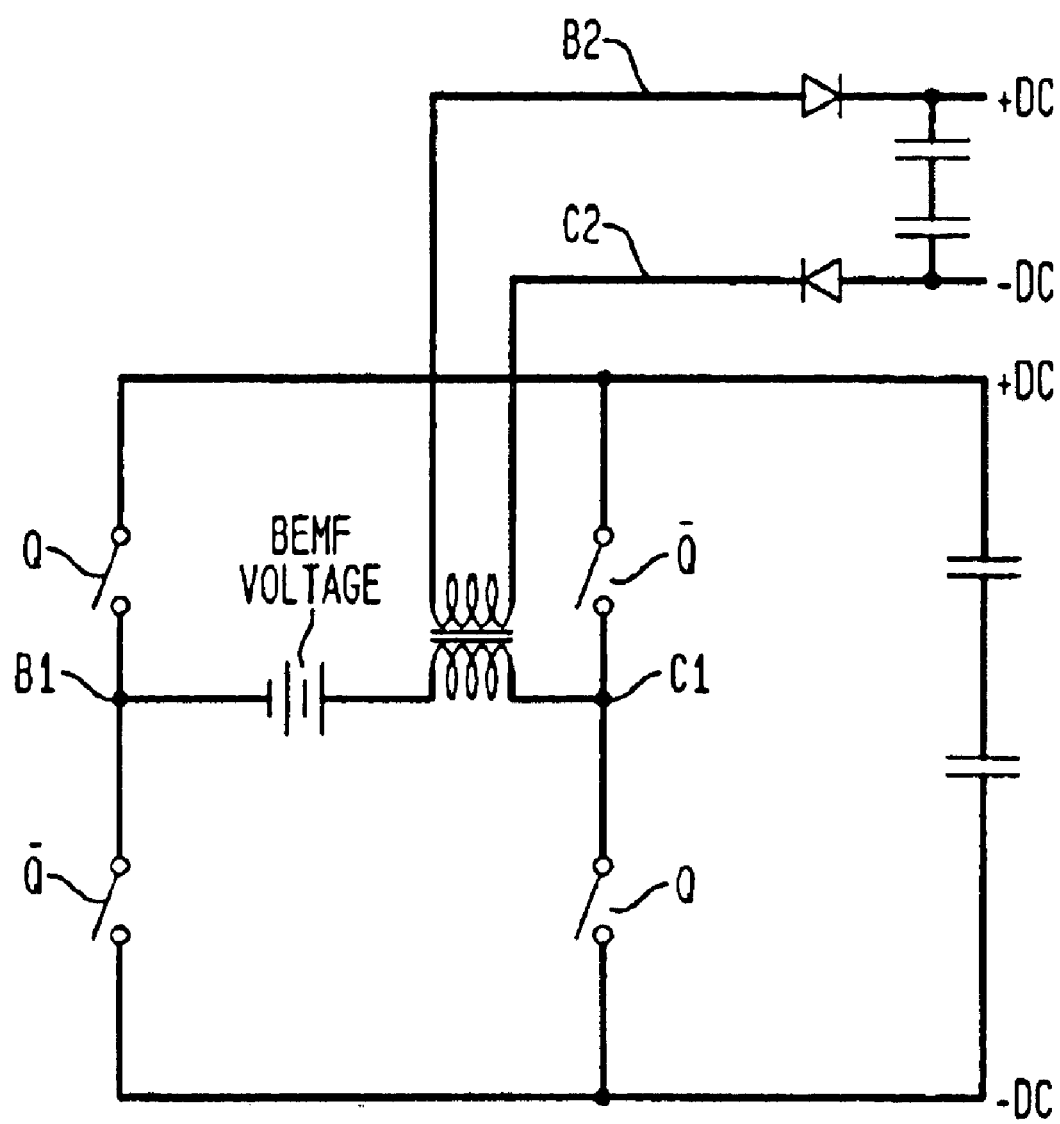
FIG. 9 is a simplified schematic diagram illustrating a boost feature for the generator system of FIG. 5.

While the ability to boost the voltage magnitude of the source of DC power within the polyphase inverter 104 is desirable and advantageously achieved by the instant invention, the invention also contemplates boosting the voltage magnitudes of the sources of DC power of the single-phase inverters 106A–C. This is advantageously achieved by way of the tight coupling between the first set of polyphase windings 124 and the other polyphase windings 126, 128, and 130. Indeed, when the intermediate polyphase inverter 110 operates to boost the voltage of the source of DC power of the polyphase inverter 104, the voltages of the respective sources of DC power of the single-phase inverters 106A–C are likewise boosted. This will be described in more detail with reference to FIG. 9. FIG. 9 is a schematic diagram illustrating the previously described Q and Q NOT switching elements of the intermediate polyphase inverter 104. The BEMF voltage of the combined B1 and C1 windings of the first set of polyphase windings 124 is shown coupled between the respective legs of the partial three-phase bridge circuit. The combined B2 and C2 windings of another set of polyphase windings 126 is shown inductively coupled to the B1 and C1 windings of the first set of polyphase windings 124. Part of the three-phase rectifier circuit and the source of DC power of the single-phase inverter 106A are shown connected to the B2 and C2 windings.

As discussed above with respect to FIG. 8, during a portion of the switching cycle the Q switching elements are biased on and the Q NOT switching elements are biased off. The current ramps up in the B1 and C1 windings + to − from left to right. This reverse biases the diodes of the rectifier of the single-phase inverter 106A. During the latter portion of the switching cycle, however, the Q switching elements are turned off and the Q NOT switching elements are turned on. This causes the voltage across the B1 and C1 windings to reverse (− to + from left to right), which boosts the voltage of the source of DC power of the polyphase inverter 104. This also forward biases the diodes of the rectifier of the single-phase inverter 106A and boosts the voltage of the source of DC power of that inverter as well. The same thing is achieved in the other single-phase inverters 106B and 106C.

Advantageously, the intermediate polyphase inverter 110 is capable of boosting all of the sources of DC power, within the polyphase inverter 104 and within the single-phase inverters 106A–C. It is noted that in this mode of operation, the intermediate polyphase inverter 110 may also drive the polyphase machine 102 as a motor, which may be beneficial when used to initiate the rotation of a prime mover (not shown) that is mechanically linked to the rotation of the polyphase machine 102.

Figure 10:
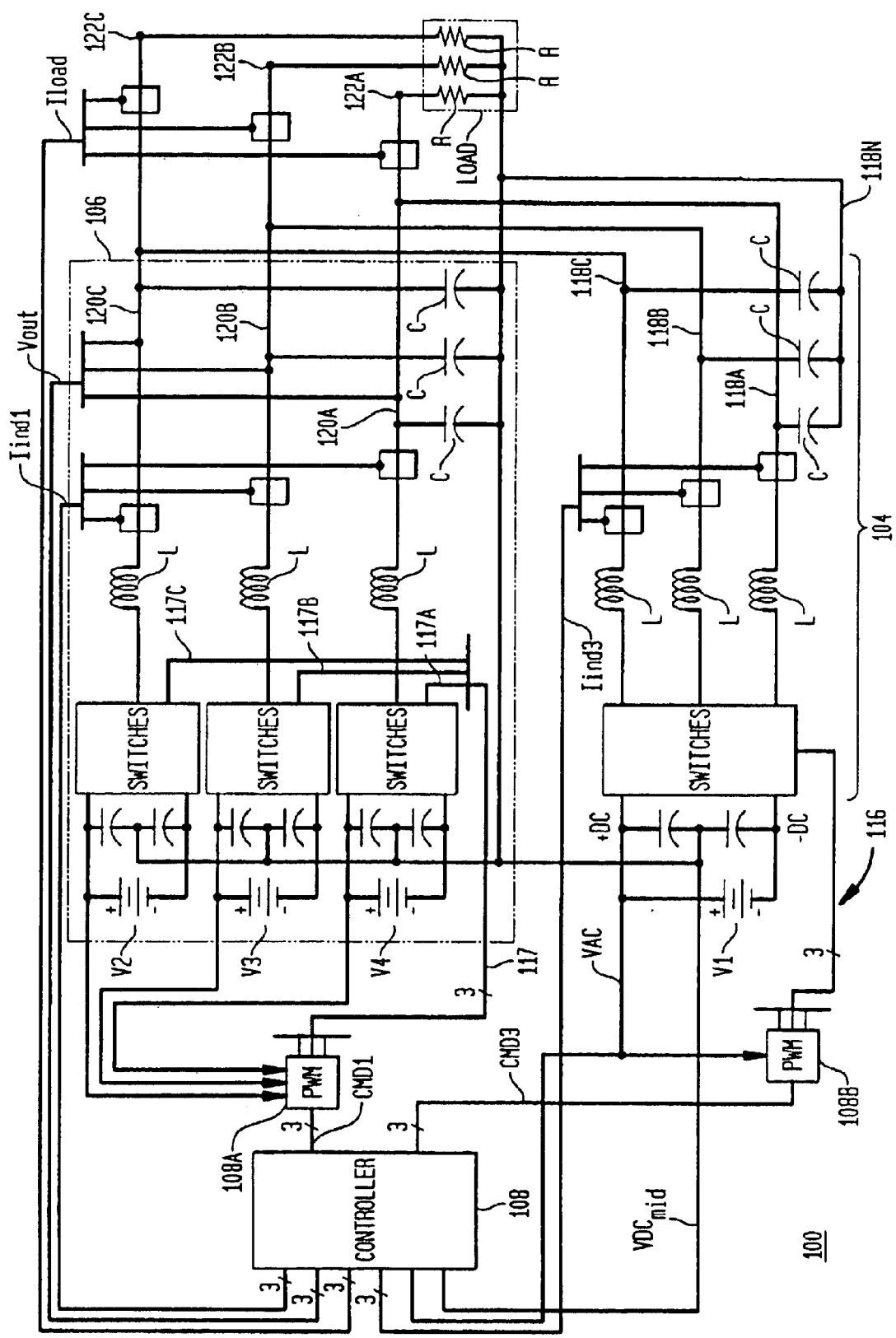
FIG. 10 is a block diagram illustrating further details concerning the control of the generator system of FIG. 4 when in a parallel configuration.

Reference is now made to FIG. 10, which is a block diagram of the generator system 100 in the parallel configuration. The block diagram of FIG. 10 provides further details over those of FIGS. 4–6, particularly with respect to the controller 108 and the signaling it receives and produces. In its preferred implementation, the controller 108 preferably operates in a synchronous frame mode and receives one or more of the following signals as input: signals indicative of the currents through the respective series inductors (L) of the single-phase inverters 106A, 106B, and 106C (these signals are collectively labeled as Iind1); signals indicative of the respective voltages across the shunt capacitors (C) of the single-phase inverters 106A, 106B, and 106C and across the shunt capacitors (C) of the polyphase inverter 104 (these signals are collectively labeled Vout); signals indicative of the current into the polyphase load (these signals are collectively labeled Iload); signals indicative of the respective currents through the series inductors (L) of the polyphase inverter 104 (these signals are collectively labeled Iind3); the voltage VDC, from the negative DC rail to the positive DC rail of the source of DC power of the polyphase inverter 104; and the voltage of the intermediate node of the capacitive half-bridge of the source of DC power of the polyphase inverter 104 (labeled VDCmid).

It is noted that the polyphase machine 102, the respective rectifiers of the inverters, and the intermediate polyphase inverter (if used) are represented by respective voltage sources V1, V2, V3, and V4. In accordance with other aspects of the invention, the polyphase machine 102 need not be employed and the voltages V1–4 may be obtained in any other way known to those skilled in the art.

The controller 108 preferably outputs a command signal, Cmd1, that is indicative of the voltage magnitude, current magnitude, and phase characteristics of the respective single-phase outputs from the single-phase inverters 106A, 106B, and 106C. When the generator system 100 is a three-phase system, the command signal Cmd1 contains three components, one for each of the single-phase inverters 106A–C. The controller 108 preferably also produces another command signal, Cmd3, that is indicative of the voltage magnitude, current magnitude, and phase characteristics of the polyphase output from the polyphase inverter 104. Again, when the generator system 100 is a three-phase system, the command signal Cmd3 contains three components, one for each phase of the polyphase inverter 104.

The command signal Cmd1 is input to a first PWM circuit 108A, which produces respective PWM voltage command signals 117 (there are three signals in this three-phase example). Each of the PWM voltage command signals 117 provides driver signaling for a respective one of the half-bridge switching circuits of the single-phase inverters 106A–C. Any of the known techniques for implementing the PWM circuit 108A may be employed without departing from the spirit and scope of the invention. For example, the PWM circuit 108A may employ respective comparators, which compare the respective components of the command signal Cmd1 to one or more ramp signals in order to produce the PWM voltage command signals 117. In this regard, the respective magnitudes of the V2–4 voltages are preferably also input to the first PWM circuit 108A in order to adjust the respective duty cycles of the PWM voltage command signals 117 as needed to obtain desirable output voltage, current and phase characteristics. While PWM circuit 108A is illustrated as being outside of the controller 108, it may also be integral with the controller 108 if desired.

The command signal Cmd3 is input to a second PWM circuit 108B, which produces respective PWM voltage command signals 116 (there are three signals in this three-phase example). Each of the PWM voltage command signals 116 provides driver signaling for a respective one of the legs of the polyphase inverter 104. The respective magnitude of the V1 voltage is preferably also input to the second PWM circuit 108B in order to adjust the respective duty cycles of the PWM voltage command signals 116 as needed to obtain desirable output voltage, current and phase characteristics. While PWM circuit 108 is illustrated as being outside of the controller 108B, it may also be integral with the controller 108 if desired.

Any of the known techniques may be employed to measure the respective currents through the series inductors (L) and through the respective phases of the polyphase load. For example, current transformers (and associated signal conditioning circuitry), sense resistors, etc., may be employed to produce the respective current signals Iind1, Iload, and Iind3.

As previously noted, the respective phases 118A–C of the polyphase output of the polyphase inverter 104 are coupled in parallel with the respective single-phase outputs 120A–C of the single-phase inverters 106A–C in order to produce the respective phases 122A–C of the aggregate polyphase output to the load.

Figure 11:
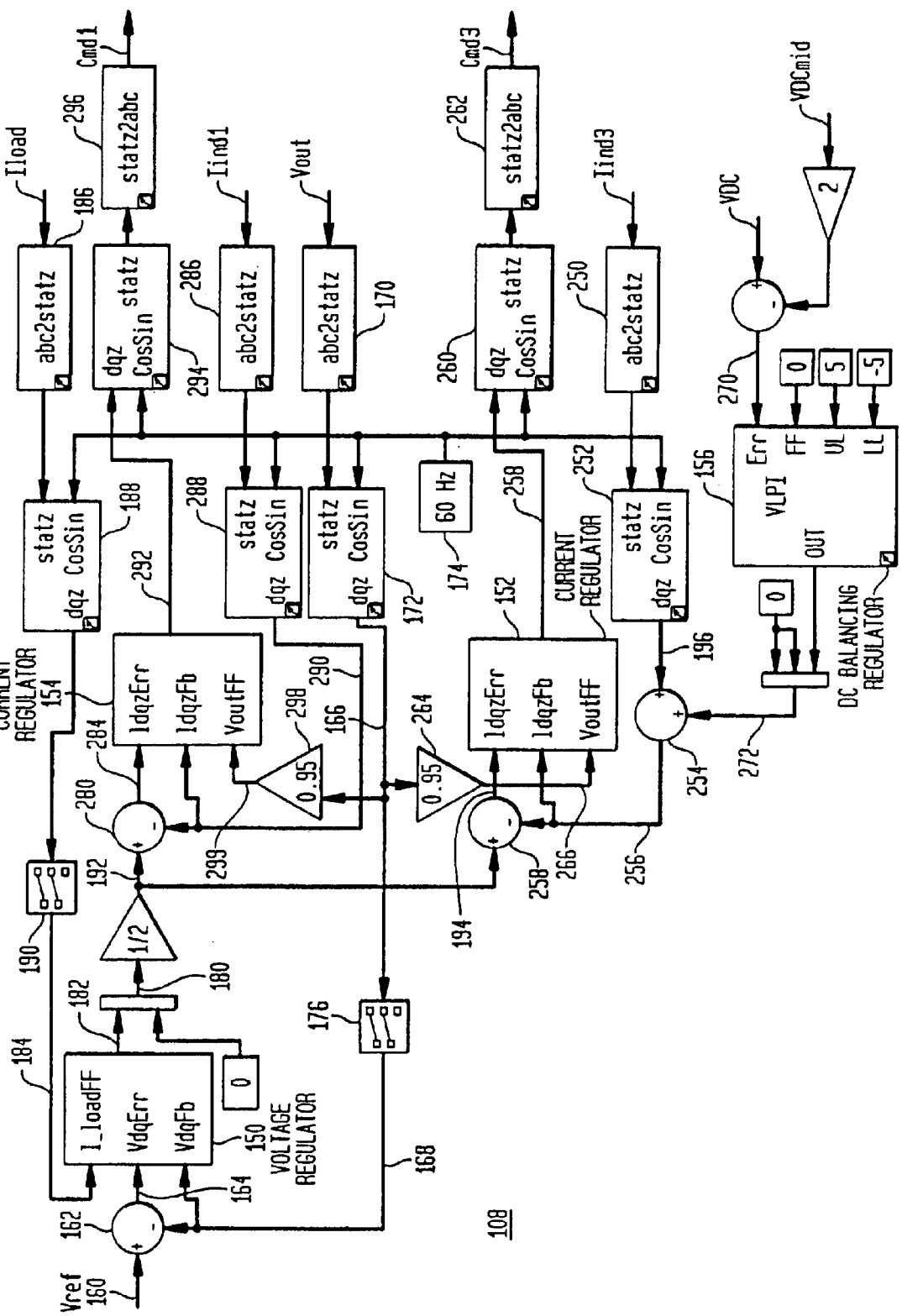
FIG. 11 is a block diagram illustrating certain aspect of a controller suitable for use in the parallel configured generator system of FIG. 10.

Reference is now made to FIG. 11, which is a block diagram of a circuit suitable for implementing the controller 108 for the parallel configuration. The controller 108 includes a voltage regulator 150, a first current regulator 152, a second current regulator 154, and a DC balancing regulator 156. In accordance with one or more aspects of the present invention, the controller 108 preferably produces the command signal Cmd3 in a way that can offset the respective phase voltages of the polyphase output (at nodes 118A, 118B, and 118C) with respect to the intermediate node (the neutral line 118N) of the polyphase inverter 104 in order to compensate for deviations in the voltage magnitude at the intermediate node 118N away from a predetermined magnitude. More particularly, it is desirable that the intermediate node 118N is substantially at a midpoint between the positive DC and negative DC rails of the source of DC power of the polyphase inverter 104. If the magnitude of the voltage at the intermediate node 118N drifts away form the midpoint, then the respective phase voltages at nodes 118A–C will likewise drift, which may be, and often is, undesirable. Thus, it is preferred that the controller 108 is operable to sense deviations of the voltage magnitude (VDCmid) of the intermediate node 118N from the predetermined magnitude, such as the midpoint of the source of DC power. The controller 108 may therefore take corrective action by offsetting the respective phase voltages of the polyphase output (118A–C) with respect to the intermediate node 118N in order to compensate for such deviations. By way of example, this aspect of the present invention may be achieved by way of the DC balancing regulator 156.

Prior to delving into the details of the DC balancing regulator 156 and its operation, a description of the voltage and current loops within the controller 108 for producing the command signal Cmd3 for the polyphase inverter 104 will be provided. The Vout signal (indicative of the respective phase voltages at nodes 122A–C is compared with a reference voltage Vref, produced by a reference voltage, Vref 160. More particularly, a difference of the reference voltage Vref and the signal Vout is taken by an adder (or subtractor) 162 to produce an error voltage signal on line 164.

As synchronous frame operation is preferred, the signal Vout (which includes voltage magnitude and phase characteristics of each of the output phases of the polyphase inverter 104) is converted into a rotating vector having d, q, and z orthogonal components on line 166. The d, q, and z orthogonal components exist in a three-dimensional coordinate system in which the d and q components rotate about the z component at a frequency that substantially matches the output frequency of the polyphase inverter 104. For example, the output frequency may be 50 Hz, 60 Hz, 400 Hz, etc.

Although any of the known techniques may be employed to convert the Vout signal into the rotating vector having d, q, and z components, it is preferred that the three phase a, b, c Vout signal is first converted into alpha, beta, z vector components in a three-dimensional coordinate system in which the alpha, beta, z axes are stationery and 90° apart. This conversion is preferably carried out by an abc converter 170. A dzq converter 172 is preferably employed to convert the alpha, beta, z components into the d, q, and z components by utilizing frequency information provided by oscillator 174 (e.g., 60 Hz) to rotate the d and q components about the z axes.

Those skilled in the art will appreciate that these coordinate conversions may be efficiently carried out utilizing digital processing technologies, such as utilizing any of the known DSPs presently available or hereinafter developed. Indeed, it is preferred that the controller 108 be implemented by way of a DSP executing software obtained from an external (e.g., FLASH) or internal (e.g., RAM) memory. To achieve this circuit implementation, the respective signals input to and output from the controller 108 of FIG. 10 require A/D and/or D/A conversion (not shown).

The error voltage signal 164 is preferably obtained by taking a difference of the respective components of the converted Vout signal 166 and respective d, q, and (optionally) z components representing the reference voltage signal, Vref. In this regard, it has been discovered that the z component of the Vout signal 166 need not be utilized in computing the error voltage signal 164; indeed, it may be ignored. Thus, a selector 176 or other suitable device or computation may be carried out in order to pass only the d and q components of the Vout signal 166 on line 168. Thus, the difference of only the respective d and q components of the reference voltage Vref and the d and q components of the Vout signal 168 are taken in order to obtain d and q components of the error voltage signal 164.

The error voltage signal 164 is input into the voltage regulator 150 in order to produce a modified error voltage signal on line 180. It is noted here that the signal 182 output by the voltage regulator 150 need only include d and q components inasmuch as the error voltage signal 164 did not include a z component. Since it will be desirable to perform later processing utilizing a modified error voltage signal 180 having all three d, q and z components, an arbitrary z value (e.g., 0) is used to augment the modified error voltage signal 182 in order to produce a modified error voltage signal 180 having all three components.

Turning now to further details of the voltage regulator 150, that circuit receives the d and q components of the error voltage signal 164, the d and q components of the Vout signal 168, and d and q components of the output load current Iload signal 184. The d and q components of the Iload signal 184 are obtained by way of abc converter 186, dqz converter 188, and selector 190.

Figure 12:
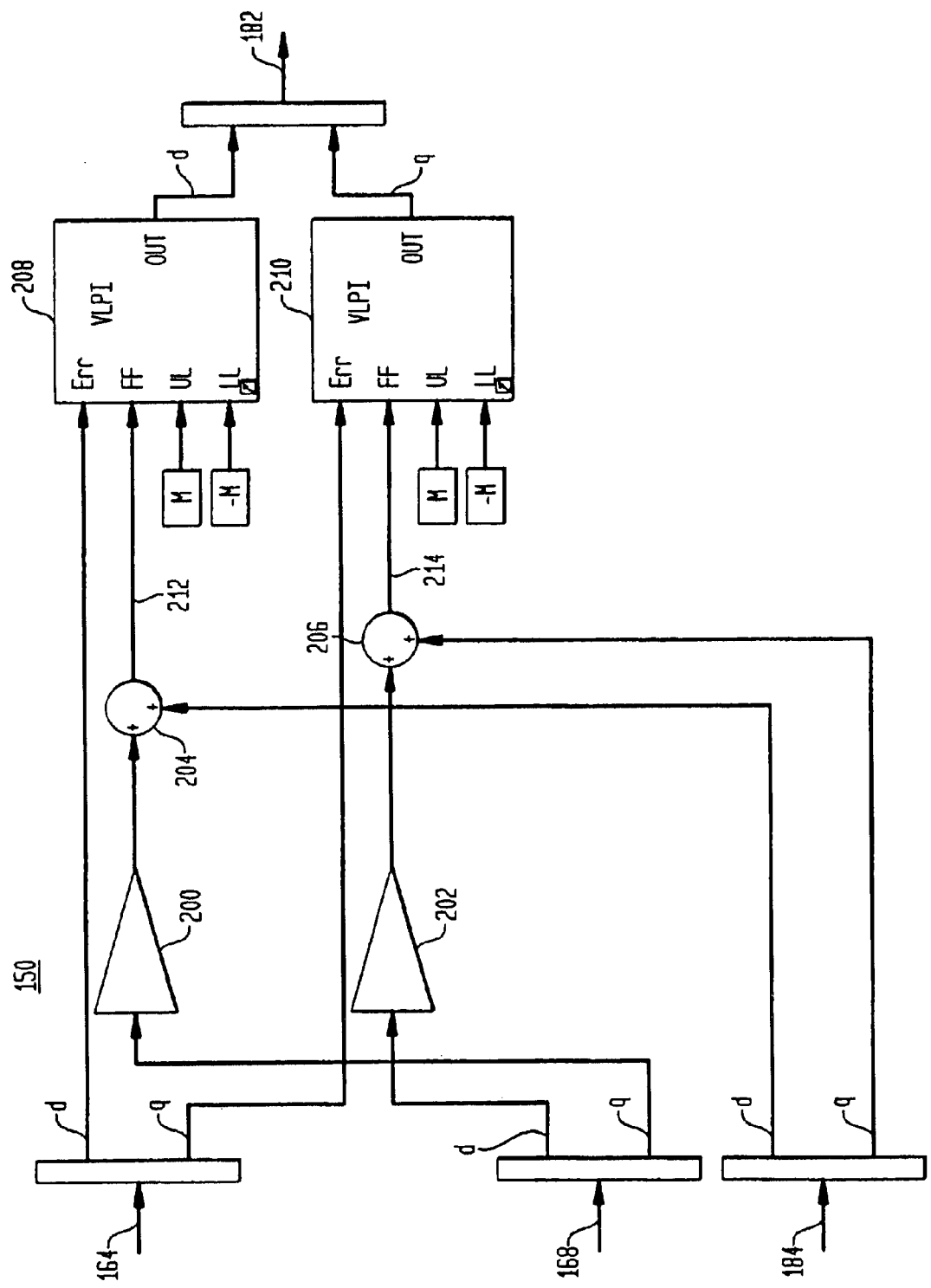
FIG. 12 is a block diagram illustrating a voltage regulator circuit that is suitable for use in the controller of FIG. 11.

With reference to FIG. 12, the voltage regulator 150 preferably employs variable limit proportional integral techniques to produce the d and q components of the modified error voltage signal 182. More particularly, the voltage regulator 150 employs techniques for canceling the inherent coupling between the d and q axes produced by the shunt capacitors of the polyphase inverter 104 (and the single-phase inverters 106A–C when employed). In this regard, the voltage regulator 150 preferably includes a first multiplier 200, a second multiplier 202, a first adder 204, a second adder 206, a first variable limit proportional integrator (VLPI) 208, and a second VLPI 210. The first multiplier preferably increases the q component of the Vout signal 168 by a factor of −G, while the second multiplier 202 preferably increases the d component of the Vout signal 168 by a factor of +G. Preferably the gain factor G is proportional to omega x C, where omega is the output frequency of the polyphase inverter 104 and C is representative of the values of the shunt capacitors of the polyphase inverter 104. The first summing circuit 204 produces a first feed forward (FF) signal 212, which is an aggregate of the output of the first multiplier 200 and the d component of the Iload signal 184. It is noted that the first FF signal 212, therefore, contains only a d component. The second summing circuit 206 produces a second FF signal 214, which is the aggregate of the output of the second multiplier 202 and the q component of the Iload signal 184. It is noted that the second FF signal 214 contains only a q component.

The first VLPI circuit 208 receives the d component of the error voltage signal 164, the first FF signal 212, an upper limit M and a lower limit −M. The second VLPI circuit 210 receives the q component of the error voltage signal 164, the second FF signal 214, an upper limit M and a lower limit −M. The outputs of the first and second VLPI circuits 208, 210 are combined such that the modified error voltage signal 182 contains respective proportional and integral components, which are limited by an upper limit of M and a lower limit of −M. While any of the known techniques may be employed to implement the first and second VLPI circuits 208, 210, it is preferred that they are implemented utilizing the arrangement of FIG. 13. For the purposes of brevity, a description of every component, functional block, etc. of the VLPI of FIG. 13 will not be provided inasmuch as it will be readily apparent to one skilled in the art in view of the description herein and the available publications in the art. Indeed, details of this type of VLPI circuit may be found in Dusan Borojevic, "Nonlinear Algorithms for Fast and Robust Control of Electrical Drives," Ph.D. dissertation, Virginia Polytechnic Institute (Blacksburg, Va.), 1986, the entire disclosure of which is hereby incorporated by reference.

It is noted, however, that the proportional gain Kp and the integral gain Ki are established as a function of the series inductors (L) and shunt capacitors (C) of the polyphase inverter 104 and the single-phase inverters 106A–C (if employed). Further, the values of Kp and Ki are preferably adjusted depending on whether the generator system 100 is in the parallel configuration (FIG. 10) or in the series configuration, which will be discussed in more detail later in this description with respect to FIG. 15. By way of example, when the generator system is in the parallel configuration, the output frequency is 60 Hz, the series inductors are 180 uH, and the shunt capacitors are 60 uF, the proportional gain Kp is preferably about 0.94 and the integral gain factor Ki is preferably about 112. Further, the VLPI circuit of FIG. 13 depends on a sampling frequency Tsmp, which should be substantially higher than the output frequency of the polyphase inverter 104 and the single-phase inverters 106A–C. By way of example, the sampling frequency Tsmp may be about 20 KHz. It has been found that values of +/−300 for +/−M are effective in achieving desired results.

Turning again to FIG. 11, the modified error voltage signal 180 is preferably multiplied by a factor of about one half to produce the modified error voltage signal 192 when the polyphase inverter 104 and the single-phase inverters 106A–C are in parallel. It is noted, however, that the controller 108 may be utilized with the polyphase inverter 104 alone in order to produce a polyphase output to the load, which would not require a reduction in the modified error voltage signal 180 by a factor of one half. The reduction of the modified error voltage signal 180 by a factor of one half is preferably carried out such that the polyphase inverter 104 produces about one half of the output current to the polyphase load and the aggregate single-phase inverters 106A–C also produce about one half of the output current to the polyphase load.

The command signal Cmd3 (which is utilized to control the polyphase inverter 104) is produced by taking a difference of the modified error voltage signal 192 and a signal 256 indicative of the inductor current Iind3. The signal Iind3 is indicative of the currents flowing in the series inductors (L) of the polyphase inverter 104. The signal Iind3 is converted into d, q, and z components utilizing an abc converter 250 and a dqz converter 252 to produce signal 196. The Iind3 signal 196 is adjusted by way of the DC balancing regulator 156 and adding circuit 254 (which will be discussed in more detail later in this description) to produce the modified output current signal 256. The command signal 194 is preferably obtained by taking a difference of the modified error voltage signal 192 and the modified output current signal 256 utilizing an adder (or subtractor) 258. It is noted that while the modified error voltage signal 192 includes an arbitrary z component (such as 0), the z component of the modified output current signal 256 is not arbitrary and is reflected in the z component of the command signal 194. The d, q, and z components of the command signal 194 establish the voltage magnitude, current magnitude, and phase characteristics of the polyphase output (118A–C) from the polyphase inverter 104. The command signal 194 is input into the first current regulator 152 in order to produce a modified command signal 258. (The details of the first current regulator 152 will be discussed below in this description.) The d, q, and z components of the modified command signal 258 are preferably converted into the three voltage command signals of the Cmd3 command signal by way of a dqz converter 260 and an abc converter 262.

The first current regulator 152 preferably receives the command signal 194, the modified output current signal 256, and the Vout signal 166 as input to produce the modified command signal 258. It is noted that enhanced performance may be obtained by adjusting the magnitudes of the d, q, and z components of the Vout signal 166 by way of gain circuit 264. Experimentation has revealed that improved performance may be obtained by multiplying the components of the Vout signal 166 by a gain of about 0.95 to produce a Vout signal 266.

Figure 14:
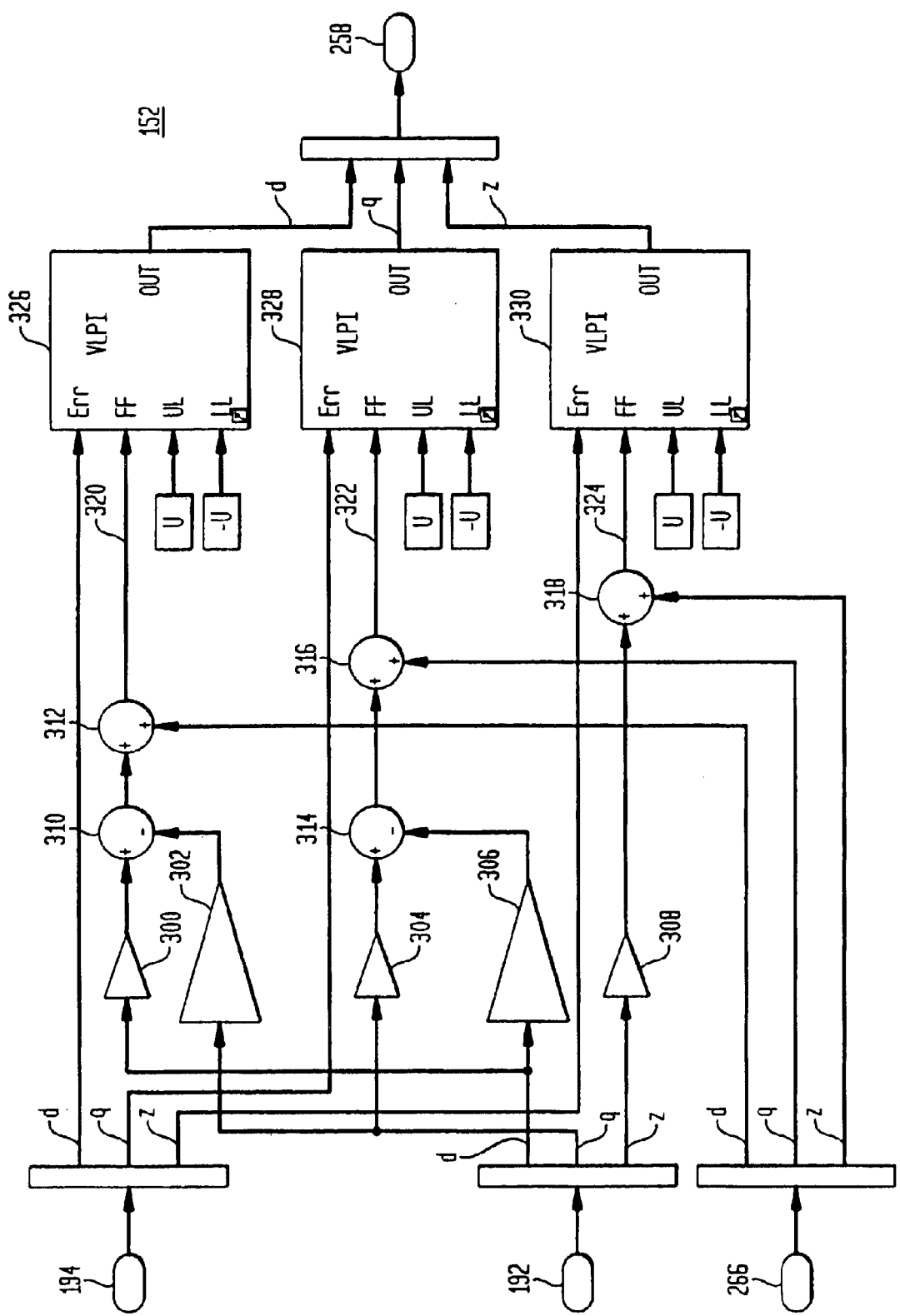
FIG. 14 is a block diagram of a current regulator circuit that is suitable for use in the controller of FIG. 11.

FIG. 14 is block diagram of a preferred implementation of the first current regulator circuit 152. It is noted that this implementation advantageously compensates for the inherent coupling among the series inductors (L) of the polyphase inverter 104 and the single-phase inverters 106A–C, and the impedance of the polyphase load. In this regard, first, second, third, fourth, and fifth gain circuits 300, 302, 304, 306, and 308 are employed to produce respective intermediate signals from various of the d, q, and z components of the command signal 194, the modified output current signal 192, and the Vout signal 266. Respective pairs of these intermediate signals are added and/or subtracted by adders/subtractors 310, 312, 314, 316, and 318, where the respective outputs from adders 312, 316, and 318 produce first, second, and third feed forward (FF) signals 320, 322, and 324.

Figure 13:
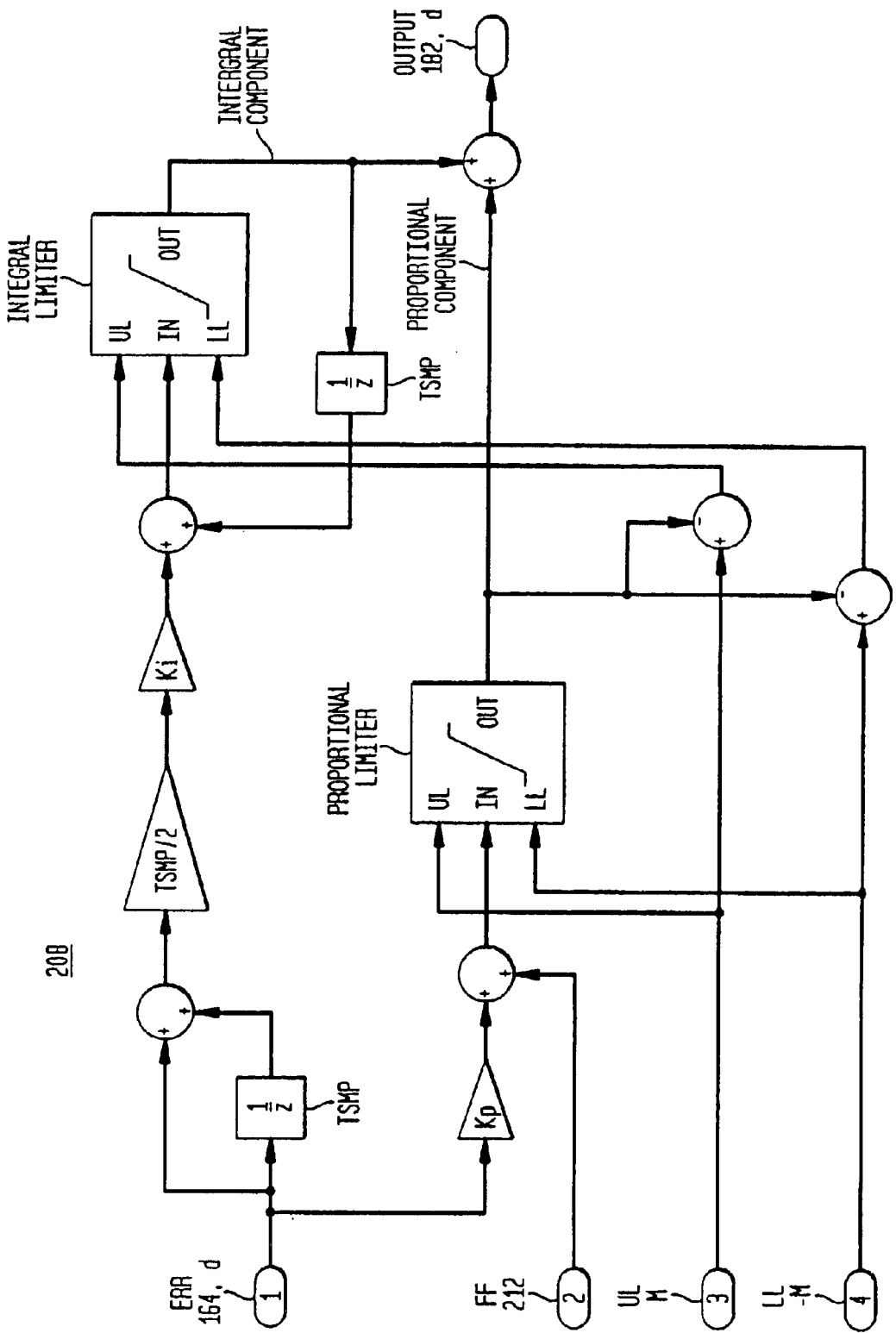
FIG. 13 is a block diagram of a suitable variable limit proportional integral regulator that is suitable for use in the voltage regulator of FIG. 12.

The first current regulator circuit 152 also preferably includes first, second, and third VLPI circuits 326, 328, and 330. The first VLPI circuit 326 is preferably operable to provide variable limit proportional integral regulation as a function of the d component of the command signal 194, the first FF signal 320, an upper limit U and a lower limit –U. The first VLPI circuit 326 outputs the d component of the modified command signal 258, whereby that component includes a proportional and integral component. While any of the known VLPI implementations may be employed, it is preferred that the configuration illustrated in FIG. 13 is used to achieve the functionality of the first VLPI circuit 326 of FIG. 14. In this case, however, the inputs to the VLPI circuit of FIG. 13 are those illustrated in FIG. 14. Experimentation has revealed that advantageous results are obtained when the proportional gain Kp is about 1.8, while the integral gain Ki is about 1950. Upper and lower limits U/–U of about 200/–200 have been found to be effective in achieving desirable characteristics for the first VLPI circuit 326.

VLPI circuits of the form illustrated in FIG. 13 may also be utilized to implement the second and third VLPI circuits 328, 330 of FIG. 14. The second VLPI circuit 328 receives the q component of the command signal 194, the second FF signal 322, and upper and lower limits U, –U as inputs. The second VLPI circuit 328 outputs the q component of the modified command signal 258, where that component includes proportional and integral components. Similarly, the third VLPI circuit 330 receives the z component of the command signal 194, the third FF signal 324, and upper and lower limits U, –U as inputs. The third VLPI circuit 330 produces the z component of the modified command signal 258, where that component includes proportional and integral components.

Turning again to FIG. 11, the d, q, and z components of the modified command signal 258 are converted into respective voltage command signals of the Cmd3 signals, which are indicative of the voltage magnitude, current magnitude, and phase characteristics of the polyphase output of the polyphase inverter 104. As was discussed above, the modified output current signal 256 is derived by adjusting the Iind3 signal 196 by way of the DC balancing regulator 156 and the adder 254. The DC balancing regulator 156 preferably receives a DC balance error signal 270, which should exhibit a magnitude of about 0 when the VDCmid signal (indicative of the voltage magnitude of the intermediate node 118N, FIG. 10) is substantially at the midpoint between the positive and negative DC rails of the source of DC power of the polyphase inverter 104. By way of example, the DC balance error signal 270 may be obtained by taking a difference of the VDC signal (indicative of the voltage from the negative to positive DC rails of the DC source of power) and twice the magnitude of the VDCmid signal. The DC balancing regulator 156 is preferably implemented utilizing a VLPI circuit receiving the DC balance error signal 270, a feed forward signal of arbitrary value, such as 0, and upper and lower limits (such as 5, –5, respectively). It has been discovered that it is the z component of the Iind3 signal 196 that best affects the offset of the polyphase output of the polyphase inverter 104 with respect to the intermediate node 118N. Accordingly, a single VLPI circuit may be utilized to implement the DC balancing regulator 156, where the output of the VLPI circuit is utilized to adjust the z component of the Iind3 signal 196 by way of the adder 254. Indeed, the d and q components of the Iind3 signal 196 are preferably not altered by the summing circuit 254 such as by arbitrarily setting the d and q components of the modified DC balance error signal 272 to 0. Any of the known techniques may be employed to implement the VLPI circuit of the DC balancing regulator 156. It is preferred, however, that the VLPI circuit of the DC balancing regulator 156 is implemented utilizing the configuration of FIG. 13. It has been found through experimentation that advantageous results are obtained when the proportional gain Kp is about 0.005 and the integral gain Ki is about 0.05.

As noted above, while the controller 108 may be utilized with the polyphase inverter 104 alone, it is preferred that the polyphase inverter 104 be utilized in conjunction with the single-phase inverters 106A–C. In this regard, the command signal Cmd1 (which is utilized to control the single-phase inverters 106A–C) is produced by taking a difference of the modified error voltage signal 192 and a signal 290 indicative of the inductor current Iind1. The signal Iind1 is indicative of the currents flowing in the series inductors (L) of the single-phase inverters 106A–C. The signal Iind1 is converted into d, q, and z components utilizing an abc converter 286 and a dqz converter 288 to produce signal 290. The command signal 284 is preferably obtained by taking a difference of the modified error voltage signal 192 and the output current signal Iind1 290 utilizing an adder (or subtractor) 280. As was the case with the control loops for the polyphase inverter 104, the modified error voltage signal 192 includes an arbitrary z component (such as 0). The z component of the output current signal Iind1 290 is not arbitrary and is reflected in the z component of the command signal 284. The d, q, and z components of the command signal 284 establish the voltage magnitude, current magnitude, and phase characteristics of the receptive single-phase outputs 120A–C (from the single-phase inverters 106A–C).

The command signal 284 is input into the second current regulator 154 in order to produce a modified command signal 292. While any of the known techniques may be employed for implementing the second current regulator 154, it is preferred that the topology utilized to implement the first current regulator 152 (FIG. 14) be employed to implement the second current regulator 154. While the signals input into the second current regulator 154 are different from the signals input into the first current regulator 152, the description hereinabove with respect to FIG. 14 applies with equal weight here in connection with the second current regulator 154. In this regard, the topology illustrated in FIG. 13 is preferably utilized to implement the VLPI circuits 326, 328, 330 of FIG. 14, it being understood that the invention contemplates other topologies. Experimentation has revealed that advantageous results are obtained when the proportional gain Kp is about 1.8, while the integral gain Ki is about 1950. Upper and lower limits U/−U of about 200/−200 have been found to be effective in achieve desirable characteristics for the VLPI circuits. The d, q, and z components of the modified command signal 292 are preferably converted into three voltage command signals of the Cmd1 command signal by way of a dqz converter 294 and an abc converter 296.

Figure 15:
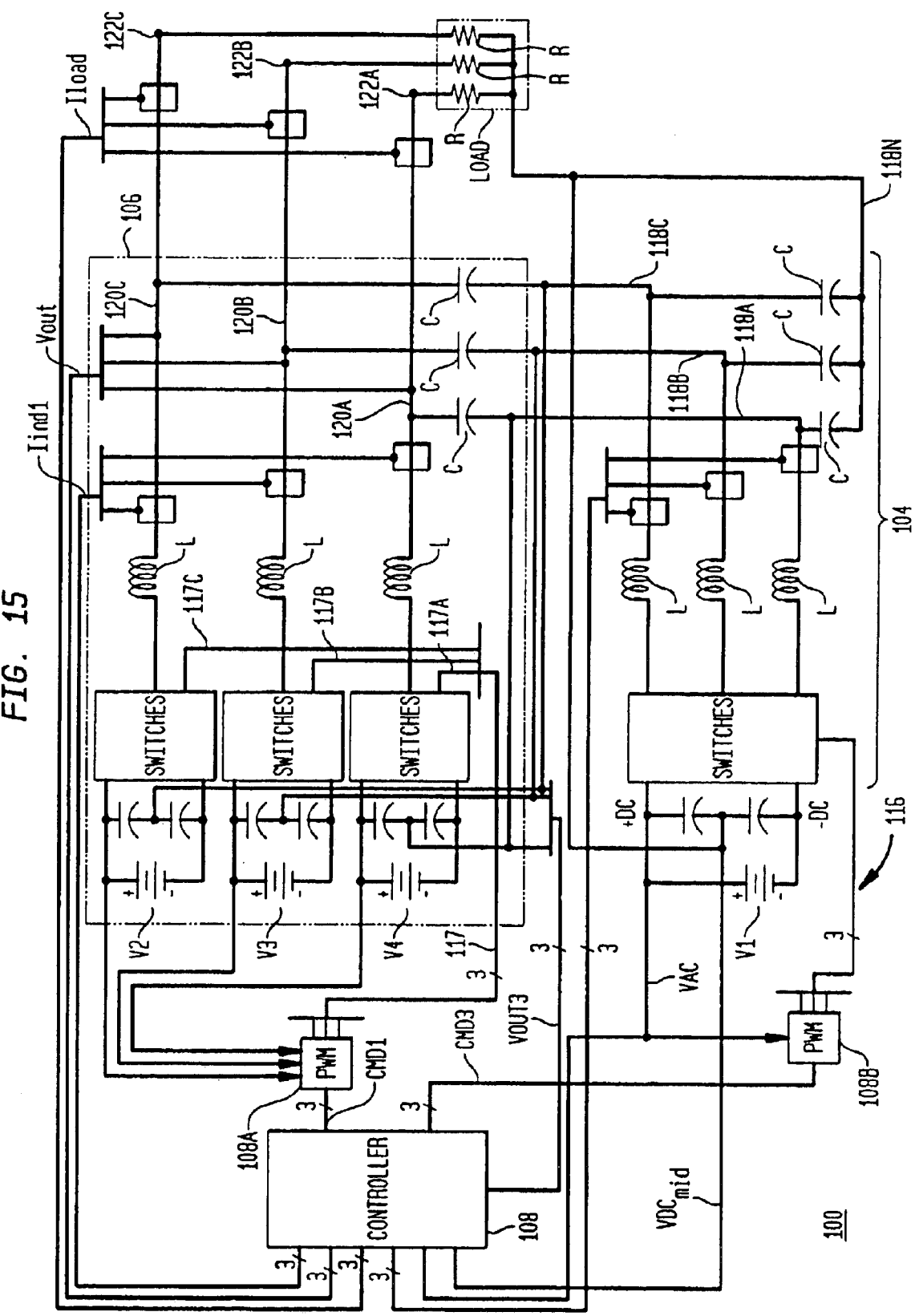
FIG. 15 is a block diagram providing further details concerning the control of the generator system of FIG. 4 when in a series configuration.

Reference is now made to FIG. 15, which is a block diagram of the generator system 100 in the series configuration. The block diagram of FIG. 15 provides further details over those of FIGS. 4–7, particularly with respect to the controller 108 and the signaling it receives and produces. In its preferred implementation, the controller 108 operates in a synchronous frame mode and receives one or more of the following signals as input: Iind1, Vout, Iload, Iind3, the voltage VDC, the voltage VDCmid, and signals indicative of the respective voltages across the shunt capacitors (C) of the polyphase inverter 104 (these signals are collectively labeled Vout3).

As was the case with the parallel configuration, the controller 108 for the series configuration outputs the command signal Cmd1 and the command signal Cmd3, which are indicative of the voltage magnitude, current magnitude, and the phase characteristics of the single-phase outputs and the polyphase output of the single-phase inverters 106A–C and the polyphase inverter 104, respectively. The respective command signals Cmd1 and Cmd3 are input into the first and second PWM circuits 108A, 108B, respectively. The PWM circuits 108A, 108B produce respective PWM voltage command signals 117, 116, which provide driver signaling for the respective half-bridge switching circuits of the single-phase inverters 106A–C and the full-bridge switching circuits of the polyphase inverter 104, respectively.

In many respects, the circuit topology of FIG. 15 for the series configuration is substantially similar to the topology of FIG. 10 for the parallel configuration. Notably, however, the respective phases 118A–C of the polyphase output of the polyphase inverter 104 are coupled in series with the respective single-phase outputs 120A–C of the single-phase inverters 106A–C in order to produce the respective phases 122A–C of the aggregate polyphase output to the load. The intermediate node of the capacitive half-bridge of the polyphase inverter 104 is coupled to the neutral line of the load in the series configuration.

Figure 16:
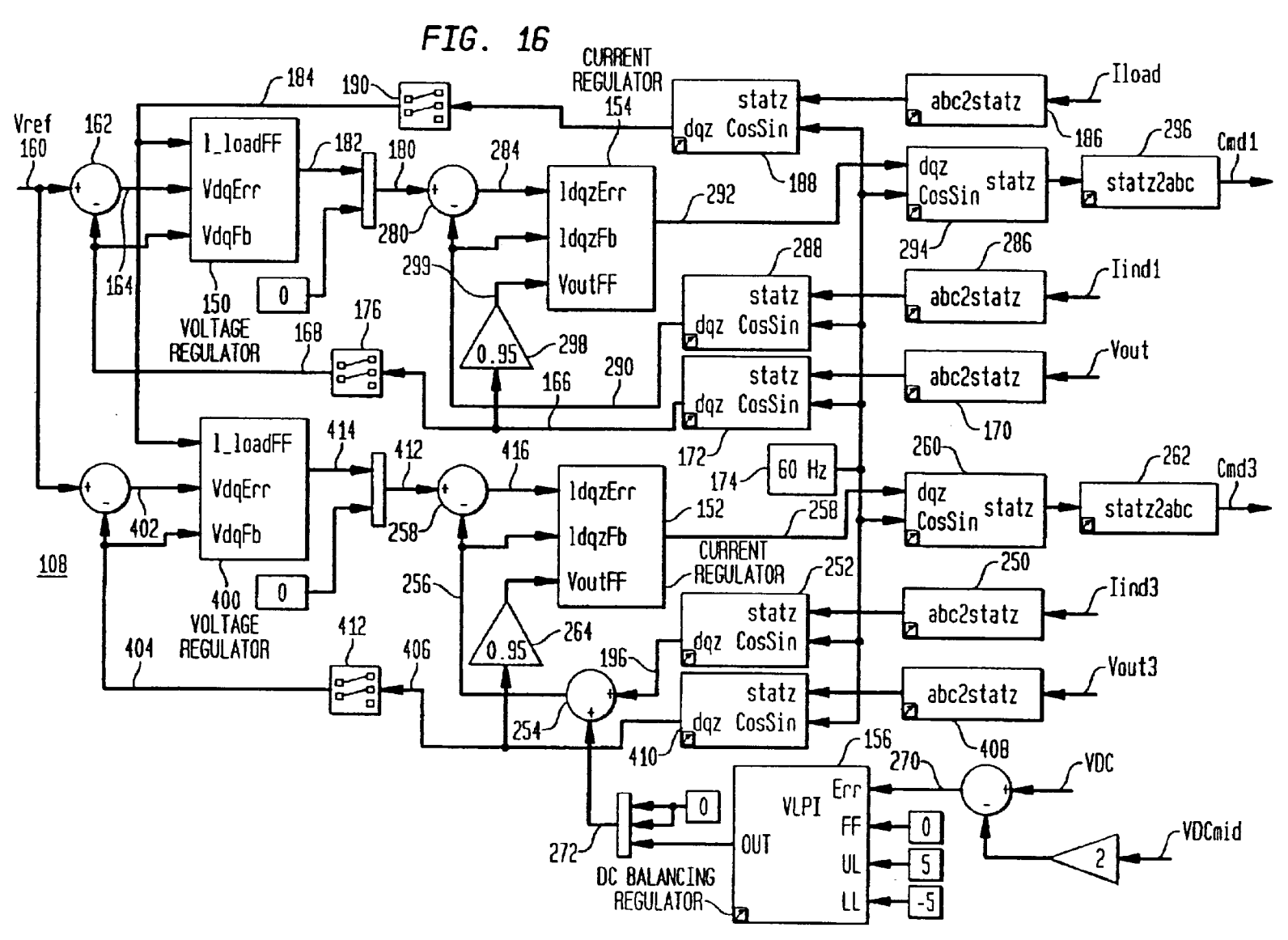

Reference is now made to FIG. 16, which is a block diagram of a circuit suitable for implementing the controller 108 for the series configuration. The controller 108 includes substantially all of the same components as the controller 108 of FIG. 11 for the parallel configuration with additional components. Thus, many of the components of FIG. 16 utilize the same reference designators as in FIG. 11, it being understood that such components operate in substantially the same way and that the description of them provided hereinabove applies with equal weight.

Among the differences between the controller 108 of FIG. 16 and that of FIG. 11, however, is the presence of a second voltage regulator 400. Thus, a second error voltage signal 402 is preferably obtained by taking a difference of the respective components of the Vout3 signal on line 404 and the respective d and q components representing the reference voltage signal Vref 160. Again, the use of the z component in this area of the controller 108 is optional as it has been discovered that the z component of the second error voltage signal 402 is not needed and may be ignored. In this regard, the Vout3 signal is preferably converted into it d, q and z components on line 406 utilizing an abc converter 408 and dqz converter 410. A selector 412 insures that only the d and q components of the Vout3 signal on line 406 appear on line 404.

The second error voltage signal 402 is input into the second voltage regulator 400 in order to produce a modified second error voltage signal on line 412. As was the case with the first voltage regulator 150, the signal on line 414 output by the second voltage regulator 400 need only include d and q components inasmuch as the second error voltage signal 402 did not include a z component. As it is desirable, however, to perform later processing utilizing a modified second error voltage signal 412 having all three d, q, and z components, an arbitrary z value, (e.g., 0) is used to augment the modified second error voltage signal 414 in order to produce the second modified error voltage signal 412 having all three components.

The second voltage regulator 400 preferably receives the d and q components of the second error voltage signal 402, the d and q components of the Vout3 signal 404, and the d and q components of the output load current Iload signal 184. Although any of the known topologies may be employed to implement the second voltage regulator 400, it is preferred that the topology utilized to implement the first voltage regulator 150 is also employed to implement the second voltage regulator 400. This topology was discussed hereinabove with respect to FIG. 12. With the exception of the different input signals, the description hereinabove with respect to FIG. 12 applies with equal weight in connection with the second voltage regulator 400. The proportional and integral gains Kp and Ki, respectively, of the VLPI circuits 208, 210 (FIGS. 12–13) are of different magnitudes in the series configuration. In particular, the proportional gain Kp in the series configuration is preferably about 0.94/3 and the integral gain Ki is preferably about 112/3 for both the first and second voltage regulators 150 and 400. It is noted, however, that the gains are a function of the output frequency, the series inductors, and the shunt capacitors, as was noted above.

Turning again to FIG. 16, unlike the controller 108 of FIG. 11, in the series configuration the first modified error voltage signal 180 is not divided by 2 in order to produce the modified error voltage signal 192. This is so because each of the phases 118A–C of the polyphase inverter 104 and each of the single-phase outputs 120A–C of the single-phase inverters 106A–C carry the full load current. Accordingly, there is no need to reduce the command for current by a factor of 2. The command signal Cmd3 (which is utilized to control the polyphase inverter 104) is produced by taking a difference of the second modified error voltage signal 412 and the signal 256, which is indicative of the inductor current Iind3. As discussed above, the signal 256 represents a modified version of the Iind3 signal inasmuch as the DC balancing regulator 156 is employed to compensate for offsets in the VDCmid voltage. The d, q, and z components of the command signal 416 establish the voltage magnitude, current magnitude, and phase characteristics of the polyphase output (118A–C) from the polyphase inverter 104. The command signal 416 is input into the first current regulator 152 in order to produce the modified command signal 258. The d, q, and z components of the modified command signal 258 are preferably converted into the three voltage command signals of the Cmd3 command signal by way of the dqz converter 260 and the abc converter 262.

The first current regulator 152 is preferably implemented in substantially the same way described hereinabove with respect to FIG. 14, and preferably with the same values utilized for the proportional gain Kp and the integral gain Ki.

Figure 17:
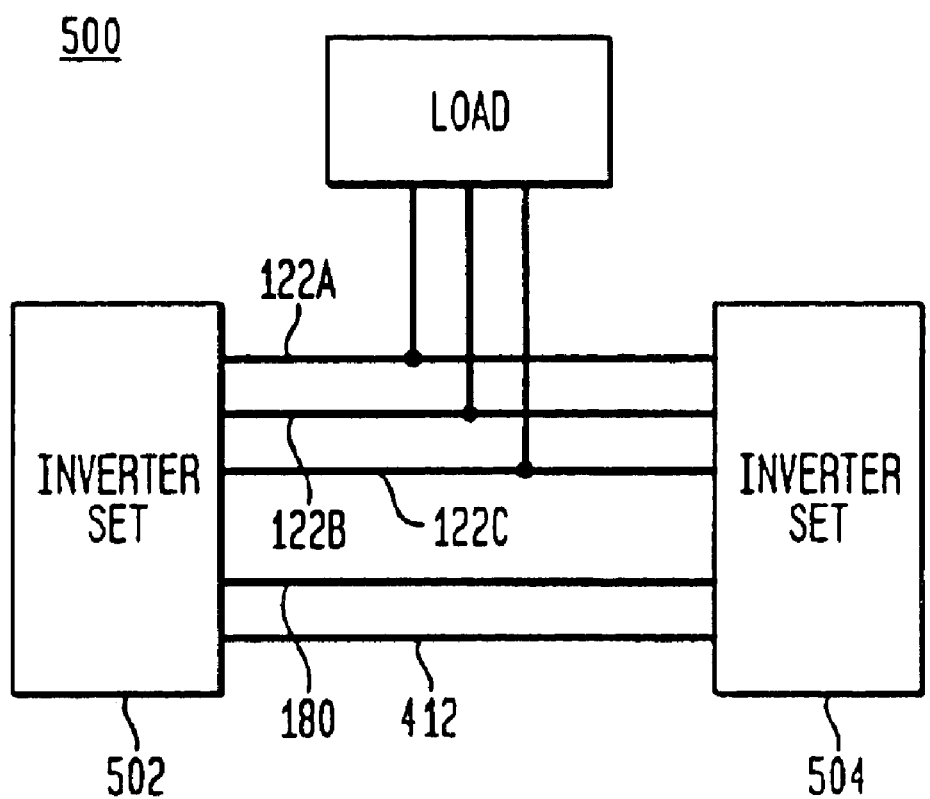
FIG. 17 is a block diagram illustrating a generator system employing a master/slave inverter configuration in order to increase load current capabilities.

Reference is now made to FIG. 17, which is a block diagram of a generator system 500 employing a master/slave inverter configuration in order to increase load current capabilities. The generator system 500 includes a first inverter set 502 and a second inverter set 504. The first and second inverter sets 502, 504 may be in the parallel or series configuration. Irrespective of which configuration the inverter sets are in, the respective polyphase outputs therefrom are coupled in parallel to form the aggregate polyphase output 122A–C delivered to the polyphase load.

Figure 18:
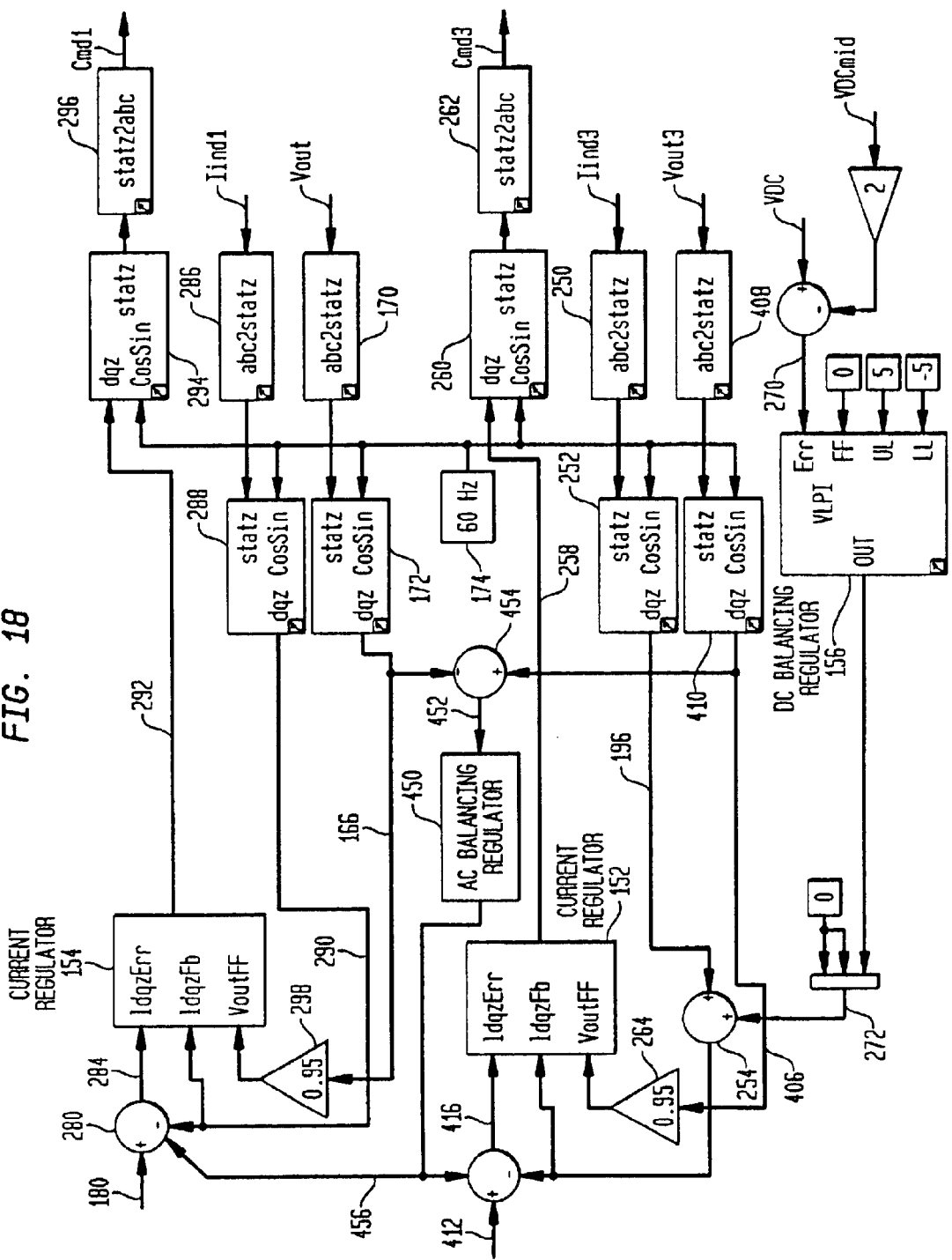
FIG. 18 is a block diagram of a controller circuit that is suitable for use in implementing the slave inverter circuit of FIG. 17.

In this configuration, one of the first and second inverter sets 502, 504 operate as a master and the other inverter set operates as the slave. The master inverter set, for example the first inverter set 502, preferably includes the controller 108 described hereinabove with respect to FIG. 16. The slave inverter set, for example the second inverter set 504, preferably includes a controller 108 as illustrated in FIG. 18. The controller 108 of FIG. 18 employs some of the same components utilized in the controller of FIG. 16. Thus, as to the common components, the description thereof provided in connection with FIG. 16 applies with equal weight to FIG. 18. Notably, however, the controller 108 of FIG. 18 includes neither the first voltage regulator 150 nor the second voltage regulator 400. Instead, the controller 108 of FIG. 18 receives the first modified error voltage signal 180 and the second modified error voltage signal 412 (or derivatives thereof) from the controller 108 of the master inverter set 502. The respective command signals Cmd1 and Cmd3 are obtained in substantially the same way as described hereinabove with respect to FIG. 16.

Turning again to FIG. 15, when the first and second inverter sets 502, 504 are each in the series configuration, the intermediate nodes between the shunt capacitors C of the polyphase inverter 104 and the single-phase inverters 106A–C of the slave inverter set 504 may tend to drift away from a desired midpoint. This is so because the controller 108 for the slave inverter set 504 does not include any voltage regulators. In order to compensate for this deviation, the controller 108 may further include an AC balancing regulator 450. The AC balancing regulator preferably receives a third error voltage signal 452 indicative of deviations between the signal Vout 166 and the signal Vout3 406. The third error voltage signal 452 is preferably obtained by employing an adder (or subtractor) 454 to take the difference of the Vout3 signal 406 and the Vout signal 166. The AC balancing regulator 450 preferably produces an output 456 that augments or modifies the respective command signals 284 and 416 in order to compensate for offsets in the respective output voltages of the polyphase inverter 104 and the single-phase inverters 106A–C of the slave inverter set 504.

When there is no offset in these voltages, the output signal 456 from the AC balancing regulator 450 is preferably null. When there is an offset in these voltages, the output signal 456 is preferably added to the command signal 284 and subtracted from the command signal 416 in order to provide compensation. Those skilled in the art will appreciate that the polarities of the system may be designed in different ways such that the output signal 456 is subtracted from the command signal 284 and added to the command signal 416.

Figure 19:
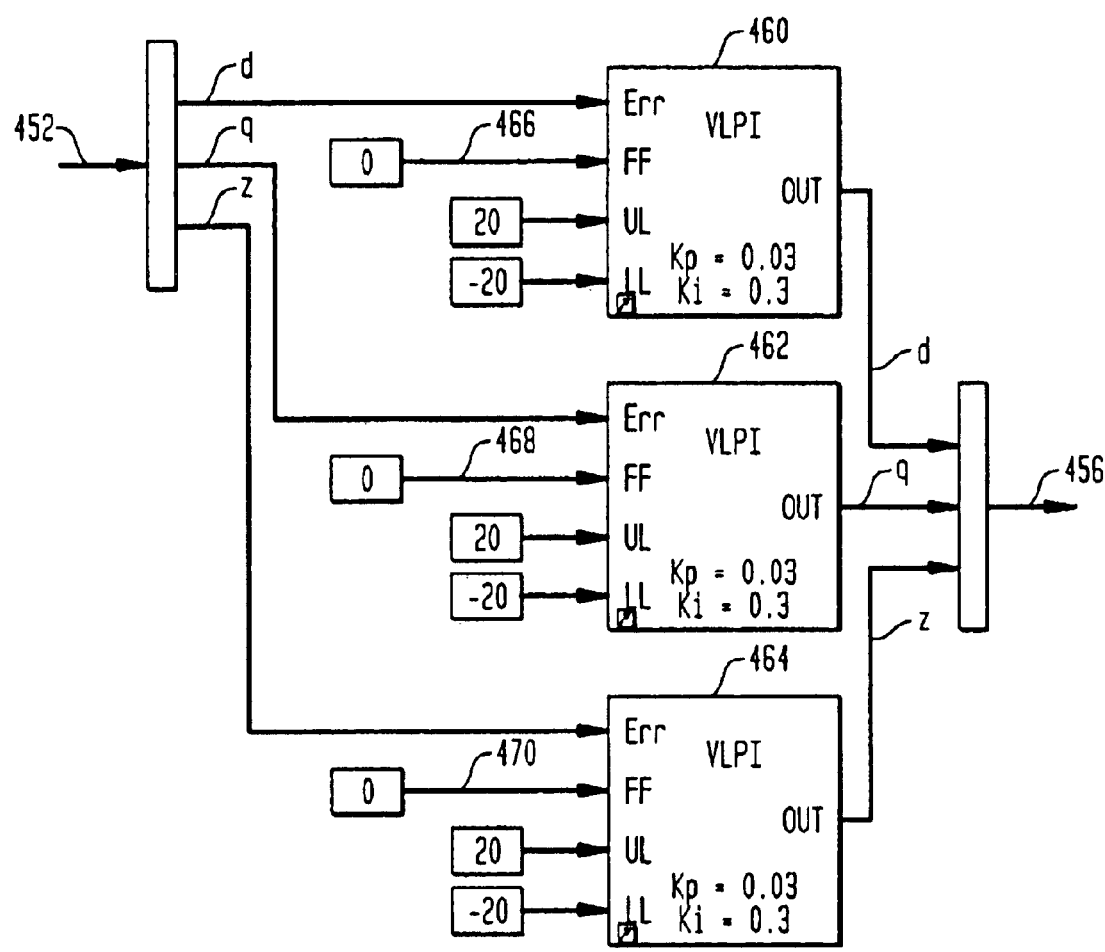
FIG. 19 is a block diagram illustrating an AC balancing regulator that is suitable for use in implementing the control circuit of FIG. 18.

While any of the known techniques may be employed for implementing the AC balancing regulator in light of the description herein, it is preferred that the AC balancing regulator 450 is implemented utilizing variable limit proportional integral control techniques. By way of example, the topology illustrated in FIG. 19 may be utilized to implement the AC balancing regulator 450. As shown, the AC balancing regulator 450 preferably includes first, second, and third VLPI circuits 460, 462, 464. The first VLPI circuit 460 receives the d component of the third error voltage signal 452, a substantially null feed forward signal 466 and upper and lower limit values (e.g., 20/−20). The second VLPI circuit 462 receives the q component of the third error voltage signal 452, a substantially null feed forward signal 468, and upper and lower limit values (e.g., 20/−20). Similarly, the third VLPI circuit 464 receives the z component of the third error voltage signal 452, a substantially null feed forward signal 470, and upper and lower limit values (e.g., 20/−20).

While any of the known techniques may be employed to implement the first, second, and third VLPI circuits 460, 462, and 464, it is preferred that the topology illustrated in FIG. 13 be employed. It has been discovered through experimentation that a proportional gain Kp of about 0.03 and an integral gain Ki of 0.3 are effective in achieving the desired characteristics for the first, second, and third VLPI circuit 460, 462, and 464. Irrespective of how the VLPI circuits are implemented, the first VLPI circuit 460 outputs the d component of the output signal 456. The second VLPI circuit 462 outputs the q component of the output signal 456. Finally, the third VLPI circuit 464 outputs the z component of the output signal 456. Advantageously, each of these components include proportional and integral components, thereby enjoying beneficial loop characteristics.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An apparatus, comprising:
   a polyphase machine having a plurality of sets of polyphase windings, each of the respective windings of a first of the sets of polyphase windings being inductively linked to one of each of the respective windings of the remaining sets of polyphase windings;
   a polyphase inverter operable to receive power from the windings of the first set and to produce a polyphase output; and
   a plurality of single-phase inverters, each operable to receive power from the windings of a respective one of the remaining sets and to produce a single-phase output,
   wherein each of the respective phases of the polyphase output may be coupled in series or parallel with one of the respective single-phase outputs to produce an aggregate polyphase output.

2. The apparatus of claim 1, wherein:
   the polyphase machine includes four sets of three-phase windings;
   the polyphase inverter is a first inverter operable to produce a three-phase output;
   the remaining inverters are second, third, and fourth inverters, each operable to produce a single-phase output; and
   each of the respective phases of the three-phase output may be coupled in series or in parallel with one of the respective single-phase outputs to produce an aggregate three-phase output.

3. The apparatus of claim 1, wherein:
   the first set of polyphase windings are sized to deliver about one half of an output power of the aggregate polyphase output; and
   each of the remaining sets of polyphase windings are sized to deliver about 1/(2×(N−1)) of the output power of the aggregate polyphase output, where N is the number of sets of polyphase windings.

4. The apparatus of claim 1, wherein:
   the polyphase inverter is sized to deliver about one half of an output power of the aggregate polyphase output; and
   each of the single-phase inverters are sized to deliver about 1/(2×(N−1)) of the output power of the aggregate polyphase output, where N is the number of sets of polyphase windings.

5. The apparatus of claim 1, wherein the inverters are synchronized with one another such that each of the respective single-phase outputs are substantially in phase with one of the respective phases of the polyphase output.

6. The apparatus of claim 1, wherein each of the inverters includes a polyphase rectifier operable to receive power from the windings of a respective one of the sets of polyphase windings, and to produce a respective source of DC power.

7. The apparatus of claim 6, wherein:
   the polyphase inverter includes: a full multiphase bridge circuit having a plurality of legs coupled across an associated one of the sources of DC power, each leg including a pair of series coupled switching elements forming an intermediate node; and a plurality of low pass filters, each being operatively coupled to a respective one of the intermediate nodes and producing a respective output phase of the polyphase output; and
   each of the single-phase inverters includes: a half bridge circuit having a single leg coupled across an associated one of the sources of DC power, the leg including a pair of series coupled switching elements forming an intermediate node; and a low pass filter operatively coupled to the intermediate node and producing an associated one of the single-phase outputs.

8. The apparatus of claim 7, further comprising a control circuit operable to produce a driver signal for each of the switching elements of the inverters.

9. The apparatus of claim 8, wherein respective pairs of the driver signals that are used to drive the switching elements of the respective legs of the polyphase inverter are also used to drive the switching elements of the respective pair of switching elements of the leg of each single-phase inverter.

10. The apparatus of claim 9, wherein the sources of DC power of the polyphase inverter and of the single-phase inverters are regulated with respect to one another.

11. The apparatus of claim 8, wherein the control circuit is operable to produce driver signals for the inverters, such that (i) respective voltage magnitudes of the phases of the polyphase output are about one half of respective voltage magnitudes of the phases of the aggregate polyphase output; and (ii) respective voltage magnitudes of the single-phase outputs are about one half of the respective voltage magnitudes of the phases of the aggregate polyphase output, when the respective phases of the polyphase output are coupled in series with the respective single-phase outputs to produce the aggregate polyphase output.

12. The apparatus of claim 11, wherein the control circuit is further operable to produce driver signals for the inverters, such that (i) respective current magnitudes of the phases of the polyphase output are about equal to respective current magnitudes of the phases of the aggregate polyphase output; and (ii) respective current magnitudes of the single-phase outputs are about equal to the respective current magnitudes of the phases of the aggregate polyphase output.

13. The apparatus of claim 8, wherein the control circuit is operable to produce driver signals for the inverters, such that (i) respective voltage magnitudes of the phases of the polyphase output are about equal to respective voltage magnitudes of the phases of the aggregate polyphase output; and (ii) respective voltage magnitudes of the single-phase outputs are about equal to the respective voltage magnitudes of the phases of the aggregate polyphase output, when the respective phases of the polyphase output are coupled in parallel with the respective single-phase outputs to produce the aggregate polyphase output.

14. The apparatus of claim 13, wherein the control circuit is further operable to produce driver signals for the inverters, such that (i) respective current magnitudes of the phases of the polyphase output are about one half of respective current magnitudes of the phases of the aggregate polyphase output; and (ii) respective current magnitudes of the single-phase outputs are about one half of the respective current magnitudes of the phases of the aggregate polyphase output.

15. The apparatus of claim 7, wherein the polyphase rectifier of the polyphase inverter includes an intermediate polyphase inverter that is operable to receive power from the windings of the first set of polyphase windings, and to produce and voltage regulate the source of DC power.

16. The apparatus of claim 15, wherein the intermediate polyphase inverter includes a full multiphase bridge circuit having a plurality of legs coupled across the source of DC power, each leg including a pair of series coupled switching elements forming an intermediate node, each being operatively coupled to a respective one of the windings of the first set of polyphase windings.

17. The apparatus of claim 16, further comprising a control circuit operable to produce a driver signal for each of the switching elements of the intermediate polyphase inverter.

18. The apparatus of claim 17, wherein the control circuit is operable to produce the driver signals such that the intermediate polyphase inverter boosts voltage received from the first set of polyphase windings to produce a boosted voltage at the source of DC power.

19. The apparatus of claim 18, wherein the control circuit is further operable to cause the intermediate polyphase inverter to boost respective voltages received from the remaining sets of polyphase windings to produce respective boosted voltages at the other sources of DC power of the single-phase inverters, by way of the inductive link between the first set of polyphase windings and one of each of the respective windings of the remaining sets of polyphase windings.

20. The apparatus of claim 19, wherein each of the respective windings of the first set of polyphase windings is wound in a multifilar configuration with one of each of the respective windings of the remaining sets of polyphase windings to increase the inductive link therebetween.

21. The apparatus of claim 20, wherein each of the respective sets of polyphase windings are in a WYE configuration.

22. The apparatus of claim 17, wherein the control circuit is operable to produce the driver signals such that the intermediate polyphase inverter drives the polyphase machine as a motor.

23. An apparatus, comprising:
means for receiving power from a first set of polyphase windings of a polyphase machine and converting the power into a polyphase output;
means for receiving power from remaining sets of polyphase windings of the a polyphase machine and inverting the power into respective single-phase outputs, wherein respective windings of the first set of polyphase windings are inductively linked to one of each of respective windings of the remaining sets of polyphase windings; and
means for producing an aggregate polyphase output by coupling each of the respective phases of the polyphase output in series or in parallel with one of the respective single-phase outputs.

24. The apparatus of claim 23, further comprising means for producing a respective source of DC power for each inverter from the received power from the windings of a respective one of the sets of polyphase windings of the polyphase machine.

25. The apparatus of claim 23, further comprising:
means for controlling the polyphase inverter such that respective voltage magnitudes of the phases of the polyphase output are about one half of respective voltage magnitudes of the phases of the aggregate polyphase output; and
means for controlling the single-phase inverters such that respective voltage magnitudes of the single-phase outputs are about one half of the respective voltage magnitudes of the phases of the aggregate polyphase output,
when the respective phases of the polyphase output are coupled in series with the respective single-phase outputs to produce the aggregate polyphase output.

26. The apparatus of claim 25, further comprising:
means for controlling the polyphase inverter such that respective current magnitudes of the phases of the polyphase output are about equal to respective current magnitudes of the phases of the aggregate polyphase output; and
means for controlling the single-phase inverters such that respective current magnitudes of the single-phase outputs are about equal to the respective current magnitudes of the phases of the aggregate polyphase output.

27. The apparatus of claim 23, further comprising:
means for controlling the polyphase inverter such that respective voltage magnitudes of the phases of the polyphase output are about equal to respective voltage magnitudes of the phases of the aggregate polyphase output; and
means for controlling the single-phase inverters such that respective voltage magnitudes of the single-phase outputs are about equal to the respective voltage magnitudes of the phases of the aggregate polyphase output,
when the respective phases of the polyphase output are coupled in parallel with the respective single-phase outputs to produce the aggregate polyphase output.

28. The apparatus of claim 27, further comprising:
means for controlling the polyphase inverter such that respective current magnitudes of the phases of the polyphase output are about one half of respective current magnitudes of the phases of the aggregate polyphase output; and
means for controlling the single-phase inverters such that respective current magnitudes of the single-phase outputs are about one half of the respective current magnitudes of the phases of the aggregate polyphase output.

29. The apparatus of claim 23, further comprising:
means for producing a respective source of DC power for each single-phase inverter from the received power from the windings of a respective one of the sets of polyphase windings of the polyphase machine;
means for producing a source of DC power for the polyphase inverter that is operable to receive power from the windings of the first set of polyphase windings, and to boost the voltage received from the first set of polyphase windings to produce a boosted voltage at the source of DC power.

30. The apparatus of claim 29, wherein the means for producing the source of DC power for the polyphase inverter is for boosting respective voltages received from the remaining sets of polyphase windings to produce respective boosted voltages at the other sources of DC power of the single-phase inverter, by way of the inductive link between the first set of polyphase windings and one of each of the respective windings of the remaining sets of polyphase windings.

31. The apparatus of claim 29, wherein the means for producing the source of DC power for the polyphase inverter is for driving the polyphase machine as a motor.

32. A method, comprising:
receiving power in a polyphase inverter from a first set of polyphase windings of a polyphase machine and converting the power into a polyphase output;
receiving power in a plurality of single-phase inverters from remaining sets of polyphase windings of the polyphase machine and converting the power into respective single-phase outputs, wherein respective windings of the first set of polyphase windings are inductively linked to one of each of respective windings of the remaining sets of polyphase windings; and producing an aggregate polyphase output by coupling each of the respective phases of the polyphase output in series or in parallel with one of the respective single-phase outputs.

33. The method of claim 32, wherein the polyphase machine includes four sets of three-phase windings, the polyphase inverter produces a three-phase output, and three single-phase inverters produce respective single-phase outputs, and the step of producing the aggregate polyphase output includes coupling each of the respective phases of the three-phase output in series or in parallel with one of the respective single-phase outputs.

34. The method of claim 32, further comprising:
sizing the first set of polyphase windings to deliver about one half of an output power of the aggregate polyphase output; and
sizing each of the remaining sets of polyphase windings to deliver about one sixth of the output power of the aggregate polyphase output.

35. The method of claim 32, further comprising:
sizing the first set of polyphase windings to deliver about one half of an output power of the aggregate polyphase output; and
sizing each of the remaining sets of polyphase windings to deliver about $1/(2\times(N-1))$ of the output power of the aggregate polyphase output, where N is the number of sets of polyphase windings.

36. The method of claim 32, further comprising:
sizing the polyphase inverter to deliver about one half of an output power of the aggregate polyphase output; and
sizing each of the single-phase inverters to deliver about one sixth of the output power of the aggregate polyphase output.

37. The method of claim 32, further comprising:
sizing the polyphase inverter to deliver about one half of an output power of the aggregate polyphase output; and
sizing each of the single-phase inverters to deliver about $1/(2\times(N-1))$ of the output power of the aggregate polyphase output, where N is the number of sets of polyphase windings.

38. The method of claim 32, further comprising synchronizing the inverters with one another such that each of the respective single-phase outputs are substantially in phase with one of the respective phases of the polyphase output.

39. The method of claim 32, further comprising producing a respective source of DC power for each inverter from the received power from the windings of a respective one of the sets of polyphase windings of the polyphase machine.

40. The method of claim 39, wherein the step of producing the respective source of DC power is performed using a respective polyphase rectifier.

41. The method of claim 32, further comprising:
controlling the polyphase inverter such that respective voltage magnitudes of the phases of the polyphase output are about one half of respective voltage magnitudes of the phases of the aggregate polyphase output; and
controlling the single-phase inverters such that respective voltage magnitudes of the single-phase outputs are about one half of the respective voltage magnitudes of the phases of the aggregate polyphase output,
when the respective phases of the polyphase output are coupled in series with the respective single-phase outputs to produce the aggregate polyphase output.

42. The method of claim 41, further comprising:

controlling the polyphase inverter such that respective current magnitudes of the phases of the polyphase output are about equal to respective current magnitudes of the phases of the aggregate polyphase output; and
controlling the single-phase inverters such that respective current magnitudes of the single-phase outputs are about equal to the respective current magnitudes of the phases of the aggregate polyphase output.

43. The method of claim 32, further comprising:
controlling the polyphase inverter such that respective voltage magnitudes of the phases of the polyphase output are about equal to respective voltage magnitudes of the phases of the aggregate polyphase output; and
controlling the single-phase inverters such that respective voltage magnitudes of the single-phase outputs are about equal to the respective voltage magnitudes of the phases of the aggregate polyphase output,
when the respective phases of the polyphase output are coupled in parallel with the respective single-phase outputs to produce the aggregate polyphase output.

44. The method of claim 43, further comprising:
controlling the polyphase inverter such that respective current magnitudes of the phases of the polyphase output are about one half of respective current magnitudes of the phases of the aggregate polyphase output; and
controlling the single-phase inverters such that respective current magnitudes of the single-phase outputs are about one half of the respective current magnitudes of the phases of the aggregate polyphase output.

45. The method of claim 32, wherein:
the polyphase inverter includes: a full multiphase bridge circuit having a plurality of legs coupled across an associated one of the sources of DC power, each leg including a pair of series coupled switching elements forming an intermediate node; and a plurality of low pass filters, each being operatively coupled to a respective one of the intermediate nodes and producing a respective output phase of the polyphase output; and
each of the single-phase inverters includes: a half bridge circuit having a single leg coupled across an associated one of the sources of DC power, the leg including a pair of series coupled switching elements forming an intermediate node; and a low pass filter operatively coupled to the intermediate node and producing an associated one of the single-phase outputs.

46. The method of claim 45, further comprising producing a driver signal for each of the switching elements of the inverters.

47. The method of claim 46, using respective pairs of the driver signals that are used to drive the switching elements of the respective legs of the polyphase inverter to drive the switching elements of the respective pair of switching elements of the leg of each single-phase inverter.

48. The method of claim 47, further comprising maintaining the sources of DC power of the polyphase inverter and of the single-phase inverters regulated with respect to one another.

49. The method of claim 32, further comprising:
producing a respective source of DC power for each single-phase inverter from the received power from the windings of a respective one of the sets of polyphase windings of the polyphase machine;
producing a source of DC power for the polyphase inverter using an intermediate polyphase inverter that is operable to receive power from the windings of the first set of polyphase windings, and to produce and voltage regulate the source of DC power.

50. The method of claim 49, wherein the intermediate polyphase inverter includes: a full multiphase bridge circuit having a plurality of legs coupled across the source of DC power, each leg including a pair of series coupled switching elements forming an intermediate node, each being operatively coupled to a respective one of the windings of the first set of polyphase windings; and a control circuit operable to produce a driver signal for each of the switching elements of the intermediate polyphase inverter.

51. The method of claim 49, further comprising controlling the intermediate polyphase inverter to boost the voltage received from the first set of polyphase windings to produce a boosted voltage at the source of DC power.

52. The method of claim 51, further comprising controlling the intermediate polyphase inverter to boost respective voltages received from the remaining sets of polyphase windings to produce respective boosted voltages at the other sources of DC power of the single-phase inverter, by way of the inductive link between the first set of polyphase windings and one of each of the respective windings of the remaining sets of polyphase windings.

53. The method of claim 52, wherein each of the respective windings of the first set of polyphase windings is wound in a multifilar configuration with one of each of the respective windings of the remaining sets of polyphase windings to increase the inductive link therebetween.

54. The method of claim 53, wherein each of the respective sets of polyphase windings are in a WYE configuration.

55. The method of claim 49, further comprising controlling the intermediate polyphase inverter such that it drives the polyphase machine as a motor.

\* \* \* \* \*